United States Patent
Kutz et al.

(10) Patent No.: US 12,177,800 B2
(45) Date of Patent: Dec. 24, 2024

(54) SIGNALING FOR ENABLING FULL-DUPLEX COMMUNICATIONS IN THE PRESENCE OF A TIMING ADVANCE

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Oren Matsrafi, Yad Modechai (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/851,410

(22) Filed: Jun. 28, 2022

(65) Prior Publication Data
US 2023/0422189 A1    Dec. 28, 2023

(51) Int. Cl.
*H04W 4/00*    (2018.01)
*H04L 27/26*    (2006.01)
*H04W 56/00*    (2009.01)

(52) U.S. Cl.
CPC ....... *H04W 56/001* (2013.01); *H04L 27/2605* (2013.01)

(58) Field of Classification Search
CPC ....... H04L 5/0035; H04L 5/14; H04L 5/1423; H04L 5/1461; H04L 5/1469; H04L 27/2605; H04L 27/2607; H04L 27/2634; H04L 27/2646; H04L 27/2691;
(Continued)

(56) References Cited

U.S. PATENT DOCUMENTS

| | | | |
|---|---|---|---|
| 11,930,469 B2 * | 3/2024 | Zhang | H04L 5/16 |
| 11,985,617 B2 * | 5/2024 | Zhang | H04L 5/0091 |
| 2021/0410092 A1 * | 12/2021 | Xu | H04W 56/005 |

(Continued)

OTHER PUBLICATIONS

Askar et al., Interference Handling Challenges toward Full Duplex Evolution in 5G and Beyond Cellular Networks, IEEE, 9 pages, Feb. 2021.*

(Continued)

*Primary Examiner* — Frank Duong
(74) *Attorney, Agent, or Firm* — QUALCOMM Incorporated

(57) ABSTRACT

Methods, systems, and devices for wireless communication are described. In some wireless communications systems, a user equipment (UE) may receive a control signal allocating downlink resources and uplink resources, where the uplink resources puncture the downlink resources and are allocated for transmitting feedback control information. The UE may generate an uplink signal containing the feedback control information and one or more cancelation tones for canceling interference between a downlink signal and the uplink signal in accordance with a timing advance value. Additionally, or alternatively, the UE may generate an uplink signal including the feedback control information, where the uplink signal contains uplink symbols and cyclic extensions appended to the uplink symbols, and the cyclic extensions may be based on the timing advance value. The UE may transmit, while receiving downlink data on the downlink resources, the uplink signal including the feedback control information using the set of uplink resources.

30 Claims, 19 Drawing Sheets

(58) Field of Classification Search
CPC ............. H04W 56/001; H04W 56/004; H04W 56/0045; H04W 56/0055; H04W 72/23
See application file for complete search history.

(56) References Cited

U.S. PATENT DOCUMENTS

2023/0370240 A1* 11/2023 Abotabl ................ H04W 72/23
2023/0389005 A1* 11/2023 Zhang ............... H04W 72/1263

OTHER PUBLICATIONS

Choi et al., Effect of Timing Misalignment on In-band Full-duplex Communications, IEEE, 4 pages, 2016.*

* cited by examiner

SIGNALING FOR ENABLING FULL-DUPLEX COMMUNICATIONS IN THE PRESENCE OF A TIMING ADVANCE

FIELD OF TECHNOLOGY

The following relates to wireless communication, including signaling for enabling full-duplex communications in the presence of a timing advance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some examples, conventional techniques for synchronizing timing for communications at a network entity may impact the timing for communications at the UE.

SUMMARY

The described techniques relate to improved methods, systems, devices, and apparatuses that support signaling for enabling full-duplex communications in the presence of a timing advance. For example, the described techniques provide for a communication device (e.g., a user equipment (UE)) and a network entity to support signaling structures that prevent uplink communication from interfering with downlink communication. In some aspects, the communication device may utilize cancelation tones to suppress interference between uplink and downlink communications. For example, a UE may receive a control signal allocating a set of downlink resources and a set of uplink resources, where the set of uplink resources punctures the set of downlink resources and the set of uplink resources is allocated for the UE to transmit feedback control information. In some aspects, the allocated set of downlink resources may be relatively larger (e.g., significantly larger, much wider in the time domain) than the allocated set of uplink resources that includes the feedback control information. The UE may generate an uplink signal that contains the feedback control information and one or more cancelation tones for canceling interference between a portion of a downlink signal and the uplink signal (e.g., using active tone cancelation techniques), where the one or more cancelation tones may be based on the feedback control information and a timing advance value, where the timing advance value may be a time difference between uplink and downlink transmissions at the UE. While receiving the portion of the downlink signal on a portion of the set of downlink resources, the UE may use the set of uplink resources to transmit the uplink signal that contains the feedback control information and the one or more cancelation tones.

Additionally, or alternatively, the UE may cyclically extend uplink symbols to align with downlink symbols to suppress interference between uplink and downlink communications. For example, the UE may receive the control signal that allocates the uplink and downlink resources. Additionally, the UE may generate an uplink signal that contains the feedback control information, where the uplink signal contains a first uplink symbol, a first cyclic extension of the first uplink symbol that is appended to the first uplink symbol, a second uplink symbol, and a second cyclic extension of the second uplink symbol that is appended to the second uplink symbol. The size of the first cyclic extension and the size of the second cyclic extension may be based on the timing advance value for transmitting the uplink signal. While receiving the downlink data on a portion of the set of downlink resources, the UE may use the set of uplink resources to transmit the uplink signal including the feedback control information.

A method for wireless communication at a UE is described. The method may include receiving a control signal allocating a set of downlink resources and a set of uplink resources, where the set of uplink resources punctures the set of downlink resources and is allocated for transmitting feedback control information, generating an uplink signal including the feedback control information and one or more cancelation tones for canceling interference between a portion of a downlink signal and the uplink signal, the one or more cancelation tones being based on the feedback control information and a timing advance value, and transmitting, while receiving the portion of the downlink signal on a portion of the set of downlink resources, the uplink signal including the feedback control information and the one or more cancelation tones using the set of uplink resources.

An apparatus for wireless communication at a UE is described. The apparatus may include a processor, memory coupled with the processor, and instructions stored in the memory. The instructions may be executable by the processor to cause the apparatus to receive a control signal allocating a set of downlink resources and a set of uplink resources, where the set of uplink resources punctures the set of downlink resources and is allocated for transmitting feedback control information, generate an uplink signal including the feedback control information and one or more cancelation tones for canceling interference between a portion of a downlink signal and the uplink signal, the one or more cancelation tones being based on the feedback control information and a timing advance value, and transmit, while receiving the portion of the downlink signal on a portion of the set of downlink resources, the uplink signal including the feedback control information and the one or more cancelation tones using the set of uplink resources.

Another apparatus for wireless communication at a UE is described. The apparatus may include means for receiving a control signal allocating a set of downlink resources and a set of uplink resources, where the set of uplink resources punctures the set of downlink resources and is allocated for transmitting feedback control information, means for generating an uplink signal including the feedback control information and one or more cancelation tones for canceling interference between a portion of a downlink signal and the uplink signal, the one or more cancelation tones being based on the feedback control information and a timing advance value, and means for transmitting, while receiving the portion of the downlink signal on a portion of the set of downlink resources, the uplink signal including the feedback control information and the one or more cancelation tones using the set of uplink resources.

A non-transitory computer-readable medium storing code for wireless communication at a UE is described. The code may include instructions executable by a processor to receive a control signal allocating a set of downlink resources and a set of uplink resources, where the set of uplink resources punctures the set of downlink resources and is allocated for transmitting feedback control information, generate an uplink signal including the feedback control information and one or more cancelation tones for canceling interference between a portion of a downlink signal and the uplink signal, the one or more cancelation tones being based on the feedback control information and a timing advance value, and transmit, while receiving the portion of the downlink signal on a portion of the set of downlink resources, the uplink signal including the feedback control information and the one or more cancelation tones using the set of uplink resources.

Some examples of the method, apparatuses, and non-transitory computer-readable medium described herein may further include operations, features, means, or instructions for receiving a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, where generating the uplink signal may be based on the second control signal.

Some examples of the method, apparatuses, and non-transitory computer-readable medium described herein may further include operations, features, means, or instructions for transmitting a request message indicating a requested quantity of resources of the set of uplink resources for the one or more cancelation tones, where the quantity of the resources allocated for the one or more cancelation tones may be based on the requested quantity of resources.

Some examples of the method, apparatuses, and non-transitory computer-readable medium described herein may further include operations, features, means, or instructions for determining the requested quantity of resources based on one or more capabilities of the UE.

Some examples of the method, apparatuses, and non-transitory computer-readable medium described herein may further include operations, features, means, or instructions for determining the requested quantity of resources for the one or more cancelation tones based on one or more directional beams selected by the UE.

Some examples of the method, apparatuses, and non-transitory computer-readable medium described herein may further include operations, features, means, or instructions for determining the requested quantity of resources for the one or more cancelation tones based on a signal-to-noise ratio at the UE.

In some examples of the method, apparatuses, and non-transitory computer-readable medium described herein, the request message includes uplink control information signaling, radio resource control signaling, medium access control (MAC)-control element (MAC-CE) signaling, or any combination thereof.

In some examples of the method, apparatuses, and non-transitory computer-readable medium described herein, the quantity of the resources allocated for the one or more cancelation tones and the feedback control information, the location of the resources allocated for the one or more cancelation tones and the feedback control information, or both, may be predetermined and based on the set of uplink resources.

In some examples of the method, apparatuses, and non-transitory computer-readable medium described herein, the quantity of the resources allocated for the one or more cancelation tones, the location of the resources allocated for the one or more cancelation tones, or both, may be based on the timing advance value.

In some examples of the method, apparatuses, and non-transitory computer-readable medium described herein, the second control signal includes downlink control information, radio resource control signaling, MAC-CE signaling, or any combination thereof.

Some examples of the method, apparatuses, and non-transitory computer-readable medium described herein may further include operations, features, means, or instructions for generating the one or more cancelation tones based on the timing advance value, where one or more values of the one or more cancelation tones may be based on the timing advance value.

In some examples of the method, apparatuses, and non-transitory computer-readable medium described herein, the set of uplink resources includes a first location of resource elements and a first quantity of resource elements allocated for the feedback control information and the set of uplink resources includes a second location of resource elements and a second quantity of resource elements allocated for the one or more cancelation tones.

A method for wireless communication at a UE is described. The method may include receiving a control signal allocating a set of downlink resources and a set of uplink resources, where the set of uplink resources punctures the set of downlink resources and is allocated for transmitting feedback control information, generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal, and transmitting, while receiving downlink data on a portion of the set of downlink resources, the uplink signal including the feedback control information using the set of uplink resources.

An apparatus for wireless communication at a UE is described. The apparatus may include a processor, memory coupled with the processor, and instructions stored in the memory. The instructions may be executable by the processor to cause the apparatus to receive a control signal allocating a set of downlink resources and a set of uplink resources, where the set of uplink resources punctures the set of downlink resources and is allocated for transmitting feedback control information, generate an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal, and transmit, while receiving downlink data on a portion of the set of downlink resources, the uplink signal including the feedback control information using the set of uplink resources.

Another apparatus for wireless communication at a UE is described. The apparatus may include means for receiving a control signal allocating a set of downlink resources and a set of uplink resources, where the set of uplink resources punctures the set of downlink resources and is allocated for transmitting feedback control information, means for generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal, and means for transmitting, while receiving downlink data on a portion of the set of downlink resources, the uplink signal including the feedback control information using the set of uplink resources.

A non-transitory computer-readable medium storing code for wireless communication at a UE is described. The code may include instructions executable by a processor to receive a control signal allocating a set of downlink resources and a set of uplink resources, where the set of uplink resources punctures the set of downlink resources and is allocated for transmitting feedback control information, generate an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal, and transmit, while receiving downlink data on a portion of the set of downlink resources, the uplink signal including the feedback control information using the set of uplink resources.

Some examples of the method, apparatuses, and non-transitory computer-readable medium described herein may further include operations, features, means, or instructions for receiving, from a network entity, a message indicating the timing advance value for transmitting the uplink signal and determining the size of the first cyclic extension appended to the first uplink symbol and the size of the second cyclic extension appended to the second uplink symbol based on the timing advance value.

In some examples of the method, apparatuses, and non-transitory computer-readable medium described herein, a sum of the size of the first cyclic extension and the size of the second cyclic extension includes a symbol.

Some examples of the method, apparatuses, and non-transitory computer-readable medium described herein may further include operations, features, means, or instructions for receiving, from a network entity, a message indicating the timing advance value for transmitting the uplink signal and determining a location of the first cyclic extension appended to the first uplink symbol and a location of the second cyclic extension appended to the second uplink symbol based on the timing advance value and respective symbol indices of the first uplink symbol and the second uplink symbol.

In some examples of the method, apparatuses, and non-transitory computer-readable medium described herein, the location of the first cyclic extension includes a beginning of the first uplink symbol, an end of the first uplink symbol, or both.

In some examples of the method, apparatuses, and non-transitory computer-readable medium described herein, the location of the second cyclic extension includes a beginning of the second uplink symbol, an end of the second uplink symbol, or both.

In some examples of the method, apparatuses, and non-transitory computer-readable medium described herein, a first downlink symbol of the portion of the set of downlink resources overlaps in time with the first cyclic extension and a portion of the first uplink symbol and a second downlink symbol of the portion of the set of downlink resources overlaps in time with the second cyclic extension and a portion of the second uplink symbol, the second downlink symbol being different from the first downlink symbol.

In some examples of the method, apparatuses, and non-transitory computer-readable medium described herein, the first cyclic extension of the first uplink symbol may be appended to an end of the first uplink symbol.

In some examples of the method, apparatuses, and non-transitory computer-readable medium described herein, the second cyclic extension of the second uplink symbol may be appended to a beginning of the second uplink symbol.

A method for wireless communication at a network entity is described. The method may include transmitting a control signal allocating a set of downlink resources and a set of uplink resources, where the set of uplink resources punctures the set of downlink resources and is allocated to a UE for transmitting feedback control information and receiving, from the UE, an uplink signal including the feedback control information and one or more cancelation tones for canceling interference between a portion of a downlink signal and the uplink signal, the one or more cancelation tones being based on the feedback control information and a timing advance value.

An apparatus for wireless communication at a network entity is described. The apparatus may include a processor, memory coupled with the processor, and instructions stored in the memory. The instructions may be executable by the processor to cause the apparatus to transmit a control signal allocating a set of downlink resources and a set of uplink resources, where the set of uplink resources punctures the set of downlink resources and is allocated to a UE for transmitting feedback control information and receive, from the UE, an uplink signal including the feedback control information and one or more cancelation tones for canceling interference between a portion of a downlink signal and the uplink signal, the one or more cancelation tones being based on the feedback control information and a timing advance value.

Another apparatus for wireless communication at a network entity is described. The apparatus may include means for transmitting a control signal allocating a set of downlink resources and a set of uplink resources, where the set of uplink resources punctures the set of downlink resources and is allocated to a UE for transmitting feedback control information and means for receiving, from the UE, an uplink signal including the feedback control information and one or more cancelation tones for canceling interference between a portion of a downlink signal and the uplink signal, the one or more cancelation tones being based on the feedback control information and a timing advance value.

A non-transitory computer-readable medium storing code for wireless communication at a network entity is described. The code may include instructions executable by a processor to transmit a control signal allocating a set of downlink resources and a set of uplink resources, where the set of uplink resources punctures the set of downlink resources and is allocated to a UE for transmitting feedback control information and receive, from the UE, an uplink signal including the feedback control information and one or more cancelation tones for canceling interference between a portion of a downlink signal and the uplink signal, the one or more cancelation tones being based on the feedback control information and a timing advance value.

Some examples of the method, apparatuses, and non-transitory computer-readable medium described herein may further include operations, features, means, or instructions for transmitting a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, where the uplink signal may be based on the second control signal.

Some examples of the method, apparatuses, and non-transitory computer-readable medium described herein may further include operations, features, means, or instructions for receiving a request message indicating a requested quantity of resources of the set of uplink resources for the one or more cancelation tones and determining the quantity of the resources allocated for the one or more cancelation tones based on the requested quantity of resources.

In some examples of the method, apparatuses, and non-transitory computer-readable medium described herein, the requested quantity of resources may be based on one or more capabilities of the UE, one or more directional beams used by the UE, a signal-to-noise ratio at the UE, or any combination thereof.

In some examples of the method, apparatuses, and non-transitory computer-readable medium described herein, the request message includes uplink control information signaling, radio resource control signaling, MAC-CE signaling, or any combination thereof.

Some examples of the method, apparatuses, and non-transitory computer-readable medium described herein may further include operations, features, means, or instructions for determining the timing advance value and determining the quantity of resources of the set of uplink resources allocated for the one or more cancelation tones and the feedback control information, the location of the resources of the set of uplink resources allocated for the one or more cancelation tones and the feedback control information, or any combination thereof, based on the timing advance value.

In some examples of the method, apparatuses, and non-transitory computer-readable medium described herein, the quantity of the resources allocated for the one or more cancelation tones and the feedback control information, the location of the resources allocated for the one or more cancelation tones and the feedback control information, or both, may be predetermined and based on the set of uplink resources.

In some examples of the method, apparatuses, and non-transitory computer-readable medium described herein, the second control signal includes downlink control information, radio resource control signaling, MAC-CE signaling, or any combination thereof.

In some examples of the method, apparatuses, and non-transitory computer-readable medium described herein, the set of uplink resources includes a first location of resource elements and a first quantity of resource elements allocated for the feedback control information and the set of uplink resources includes a second location of resource elements and a second quantity of resource elements allocated for the one or more cancelation tones.

A method for wireless communication at a network entity is described. The method may include transmitting a control signal allocating a set of downlink resources and a set of uplink resources, where the set of uplink resources punctures the set of downlink resources and is allocated to a UE for transmitting feedback control information and receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

An apparatus for wireless communication at a network entity is described. The apparatus may include a processor, memory coupled with the processor, and instructions stored in the memory. The instructions may be executable by the processor to cause the apparatus to transmit a control signal allocating a set of downlink resources and a set of uplink resources, where the set of uplink resources punctures the set of downlink resources and is allocated to a UE for transmitting feedback control information and receive, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

Another apparatus for wireless communication at a network entity is described. The apparatus may include means for transmitting a control signal allocating a set of downlink resources and a set of uplink resources, where the set of uplink resources punctures the set of downlink resources and is allocated to a UE for transmitting feedback control information and means for receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

A non-transitory computer-readable medium storing code for wireless communication at a network entity is described. The code may include instructions executable by a processor to transmit a control signal allocating a set of downlink resources and a set of uplink resources, where the set of uplink resources punctures the set of downlink resources and is allocated to a UE for transmitting feedback control information and receive, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

In some examples of the method, apparatuses, and non-transitory computer-readable medium described herein, a sum of the size of the first cyclic extension and the size of the second cyclic extension includes a symbol.

In some examples of the method, apparatuses, and non-transitory computer-readable medium described herein, a location of the first cyclic extension may be based on timing advance value and a symbol index of the first uplink symbol, the location of the first cyclic extension including a beginning of the first uplink symbol, an end of the first uplink symbol, or both.

In some examples of the method, apparatuses, and non-transitory computer-readable medium described herein, a location of the second cyclic extension may be based on timing advance value and a symbol index of the second uplink symbol, the location of the second cyclic extension including a beginning of the second uplink symbol, an end of the second uplink symbol, or both.

In some examples of the method, apparatuses, and non-transitory computer-readable medium described herein, a first downlink symbol of a portion of the set of downlink resources overlaps in time with the first cyclic extension and a portion of the first uplink symbol and a second downlink symbol of the portion of the set of downlink resources overlaps in time with the second cyclic extension and a portion of the second uplink symbol, the second downlink symbol being different from the first downlink symbol.

In some examples of the method, apparatuses, and non-transitory computer-readable medium described herein, the first cyclic extension of the first uplink symbol may be appended to an end of the first uplink symbol and the second cyclic extension of the second uplink symbol may be appended to a beginning of the second uplink symbol.

DETAILED DESCRIPTION

Figure 1:
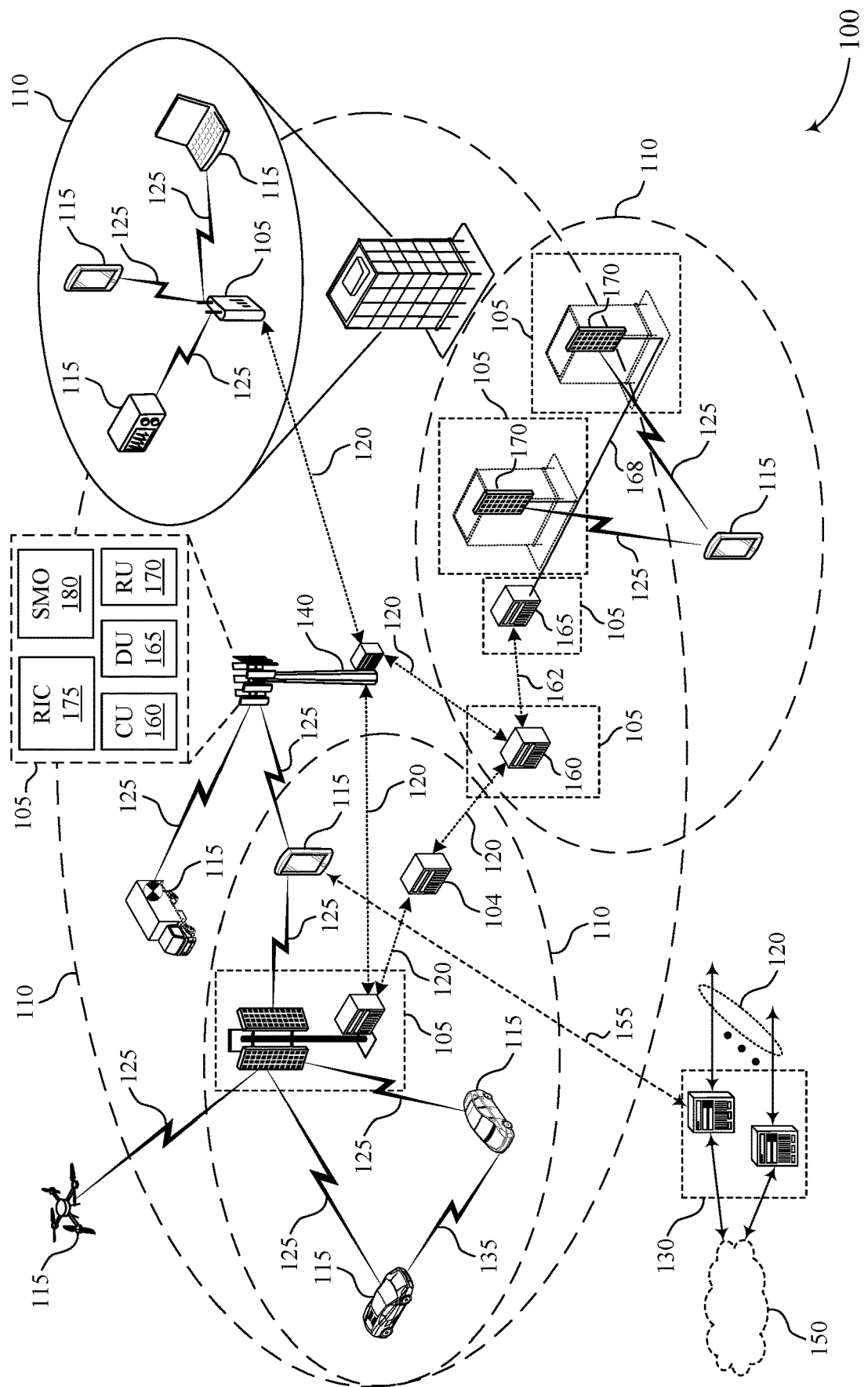
FIG. 1 illustrates an example of a wireless communications system that supports signaling for enabling full-duplex communications in the presence of a timing advance in accordance with one or more aspects of the present disclosure.

In some wireless communications systems, a user equipment (UE) may transmit relatively frequent, or near-continuous, uplink control information to a network entity, where the uplink control information includes feedback information. For instance, the UE may transmit beam management reporting, channel state feedback reporting, hybrid automatic repeat request (HARQ) acknowledgment (HARQ-ACK) reporting, beam failure recovery requests, among other examples. In such cases, the UE may operate using time-division duplexing (TDD), where uplink resources may be configured adjacent to downlink resources to enable the frequent transmissions of the uplink control information. For example, in a TDD deployment, the UE may receive an allocation of a relatively small quantity of uplink resources for uplink control feedback. The uplink resources may interrupt, or puncture, an allocation for a relatively larger quantity of downlink resources (e.g., the uplink resources may occupy a few resource blocks, whereas the downlink resources may occupy a relatively larger quantity of resource blocks). Accordingly, the UE may use the uplink resources, which interrupt the downlink resources, to send relatively frequent transmissions of the uplink control information (e.g., compared to other resource configurations where uplink resources are relatively less frequent and/or occupy a relatively greater number of resource blocks).

In some cases, uplink control transmissions sent by the UE may cause interference with the downlink transmissions. For instance, the network entity may configure a timing advance, or a timing offset, that the UE uses to enable synchronization of uplink and downlink communications at the network entity. For example, as a result of a time delay between the transmission of a signal from the UE and the reception of the same signal at the network entity (e.g., because the UE may be located some distance away from the network entity), the timing advance may adjust for the time delay and maintain relatively synchronization of signaling within the system. The timing advance, however, may cause a timing mismatch between uplink and downlink communications at the UE, such as in the case where a relatively small uplink resource allocation punctures a set of downlink resources. Here, the timing advance may result in the UE operating (e.g., temporarily) in a full-duplex mode when transmitting the uplink control information and receiving a downlink transmission, which may result in a loss of orthogonality between uplink and downlink transmissions at the UE. The loss of orthogonality between the uplink and downlink transmissions at the UE may cause the uplink transmissions to leak into (e.g., cause interference with) the downlink allocation for the downlink transmissions, resulting in interference between the uplink and downlink transmissions. Such interference between the uplink and downlink transmissions may contribute to decreased throughput, increased latency, decreased reliability in communications, among other issues.

Techniques described herein support signaling for enabling full-duplex communications in the presence of a timing advance, thereby mitigating a loss of orthogonality between uplink and downlink transmissions when transmitting uplink control information. Accordingly, the UE may prevent uplink transmissions from interfering with downlink transmissions. For example, the UE may receive a control signal allocating a set of downlink resources and a set of uplink resources, where the set of uplink resources punctures the set of downlink resources and is allocated for transmitting feedback control information (e.g., beam management reporting, channel state feedback reporting, HARQ-ACK, or the like). In some examples, the UE may add one or more cancelation tones (e.g., active cancelation tones) to uplink communications to suppress interference between the uplink and downlink communications. For example, the UE may generate an uplink signal that contains the feedback control information and the one or more cancelation tones for canceling interference between a portion of a downlink signal and the uplink signal. The one or more cancelation tones may be generated based on the feedback control information and a timing advance value. In such examples, the UE may transmit, while receiving the portion of the downlink signal, the uplink signal containing the feedback control information and the one or more cancelation tones.

Additionally, or alternatively, the UE may cyclically extend uplink symbols to align with downlink symbols in the time domain such that orthogonality is restored between uplink and downlink communications. For example, the UE may receive the control signal for the allocation of the uplink and downlink resources. Additionally, the UE may generate an uplink signal including the feedback control information, where the uplink signal includes at least a first uplink symbol, a first cyclic extension of the first uplink symbol appended to the first uplink symbol, a second uplink symbol, and a second cyclic extension of the second uplink symbol that is appended to the second uplink symbol. The second uplink symbol may be different form the first uplink symbol. Additionally, a size of the first cyclic extension and a size of the second cyclic extension may be based on the timing advance value for transmitting the uplink signal. In such examples, the UE may transmit the feedback control information using the set of uplink resources while receiving downlink data on a portion of the set of downlink resources. Here, the use of the cyclic extensions may provide enhanced interference cancellation at the UE for uplink symbols that overlap in time with downlink symbols, thereby improving communications efficiency at the UE.

Aspects of the disclosure are initially described in the context of wireless communications systems. Examples of a cyclic extension scheme and a process flow supporting signaling for enabling full-duplex communications in the presence of a timing advance are then described. Aspects of the disclosure are further illustrated by and described with reference to apparatus diagrams, system diagrams, and flowcharts that relate to signaling for enabling full-duplex communications in the presence of a timing advance.

FIG. 1 illustrates an example of a wireless communications system 100 that supports signaling for enabling full-duplex communications in the presence of a timing advance in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (MC) 175 (e.g., a Near-Real Time RIC (Near-RT MC), a Non-Real Time MC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support signaling for enabling full-duplex communications in the presence of a timing advance as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, a network entity 105 may use a multiple incremental redundancy scheme (MIRS) for rate adaptation to reach communication results close to that of an optimal modulation and coding scheme (MCS) selection and to achieve communications at a capacity code rate regardless of mobility (e.g., of a UE 115). For example, MIRS may be utilized if there is an overestimated MCS associated with an overestimated coding rate (e.g., to ensure throughput is not lost due to an underestimated coding rate). The network entity 105 may rely on extensive usage of small-sized retransmissions (e.g., of incremental redundancy (IR) HARQ (IR-HARQ)) for relatively fine, dynamic adaptation of the coding rate based on the ACK/NACK feedback from the receiving device (e.g., the UE 115). That is, each time the receiver sends a NACK, or alternatively, each time the receiver does not send an ACK, the small number of additional redundancy bits may be transmitted. The UE 115 may also use per-code block (CB) feedback to further maximize channel utilization.

In some cases, the network entity 105 may utilize MIRS following a communications process. On a first transmission, the network entity 105 (e.g., a transmitter) may select an over-optimistic MCS that may be expected to fail in a number of examples. The selection may indicate the coding parameters, such as the coding rate and a transport block size (TBS), among others, for all of the following retransmissions. In some cases, for each decoding failure, the receiver (e.g., a UE 115) may transmit feedback to the network entity 105 including per-CB decoding results. Additionally, or alternatively, the UE 115 may convey additional information to allow the network entity 105 faster convergency on the actual rate. In some cases, for each decoding failure, the network entity 105 may schedule and send additional bits for each failing transport block (TB) (and optionally for each failing CB) from the initial buffered coded bits of the CBs. The added bits in each retransmission may be used to reduce the effective coding rate of each CB in fine steps until all CBs, and consequently the whole TB, are successfully decoded. In some cases, the total number of bits sent over the first and subsequent transmissions may determine the coding rate used for each TB.

In some cases, a UE 115 may transmit frequent (e.g., near-continuous) uplink control information (e.g., feedback information) to a network entity 105. For instance, the UE 115 may transmit near-continuous feedback control information to the network entity 105 to provide near-continuous beam management reporting, allowing for quicker turn-around for beam management steps P1 (e.g., for beam selection) and P2 (e.g., for beam refinement). Additionally, or alternatively, the UE 115 may transmit near-continuous feedback control information to the network entity 105 to provide fast, near-continuous channel state feedback reporting to allow for improved (e.g., relatively more accurate) link adaptation for both MIRS and non-MIRS scenarios, where the channel state feedback reporting may include precoding matrix indicator (PMI) updates, rank updates, or a combination thereof.

In some cases, the UE 115 may transmit near-continuous feedback control information to the network entity 105 to provide fast gap-to-capacity feedback for MIRS applications. In such cases, the gap-to-capacity feedback may specify the size of the retransmission based on an estimation of how far a current coding rate is from a channel capacity. In some examples, the UE 115 may transmit near-continuous feedback control information to the network entity 105 to reduce ACK/NACK latency. For example, in MIRS applications, the UE 115 may transmit ACK/NACK feedback to the network entity 105 per-CB to maximize channel utilization. If the UE 115 transmits near-continuous ACK/NACK feedback per-CB, the UE 115 may decrease the quantity of HARQ processes, reducing memory and/or cost at the UE 115 while also supporting parameters for latency and throughput (e.g., ultra-low latency applications) for communications.

In some examples, the UE 115 may provide relatively fast beam failure recovery requests by transmitting the near-continuous feedback control information to the network entity 105. Additionally, or alternatively, the UE 115 may support relatively fast handover procedures, as UE 115 may perform transmission-related steps with reduced latency when transmitting the near-continuous feedback control information. In other examples, the UE 115 may increase the speed of connected mode discontinuous reception (CDRX) wake-up procedures by providing immediate or near-immediate link adaptation (LA) and beam management reporting, allowing for efficient wake-up procedures, relatively more frequent CDRX sessions, and decreased battery consumption at the UE 115, among other benefits.

To enable frequent, near-continuous transmissions of the uplink feedback control information, the UE 115 may operate using TDD, where uplink resources may be configured adjacent to (e.g., interrupting, interspersed within, puncturing) downlink resources. In some cases, the network entity 105 may configure the UE 115 with a timing advance value to synchronize uplink communication (e.g., an uplink signal containing feedback control information) and downlink communication (e.g., a downlink data signal) from the perspective of the network entity 105, preventing overlap, and hence, interference, between the uplink communication and the downlink communication at the network entity 105. In some such cases, the timing advance value configured by the network entity 105 may cause a timing mismatch between the uplink communication and the downlink communication at the UE 115, resulting in the UE 115 operating (e.g., at least temporarily) in a full-duplex mode and resulting in a loss of orthogonality between the uplink communication and the downlink communication. Due to the loss of orthogonality between the uplink communication and the downlink communication, the UE 115 may transmit feedback control information in an uplink signal that leaks into a downlink, in-band allocation of resources used to receive a downlink signal. Accordingly, in some cases (such as with continuous or relatively request uplink control transmissions, among other examples), the timing advance configured by the network entity 105 may result in interference at the UE 115 between an uplink signal containing feedback control information and a downlink signal containing downlink data.

In accordance with examples as disclosed herein, a UE 115 or other wireless device temporarily operating in a full-duplex mode may reduce interference between an uplink signal containing feedback control information and a downlink signal by adding one or more cancelation tones to the uplink signal to suppress based on a timing advance value configured by the network entity 105. By generating and transmitting an uplink signal that contains the one or more cancelation tones and the feedback control information in accordance with the configured timing advance value, the UE 115 may suppress the interference resulting from the configured timing advance value. Additionally, or alternatively, the UE 115 may cyclically extend uplink symbols to align with downlink symbols in a time domain such that orthogonality is restored between the uplink signal containing the feedback control information and the downlink signal. By restoring orthogonality between the uplink signal containing the feedback control information and the downlink signal, the UE 115 may at least partially eliminate interference resulting from the configured timing advance value.

Figure 2:
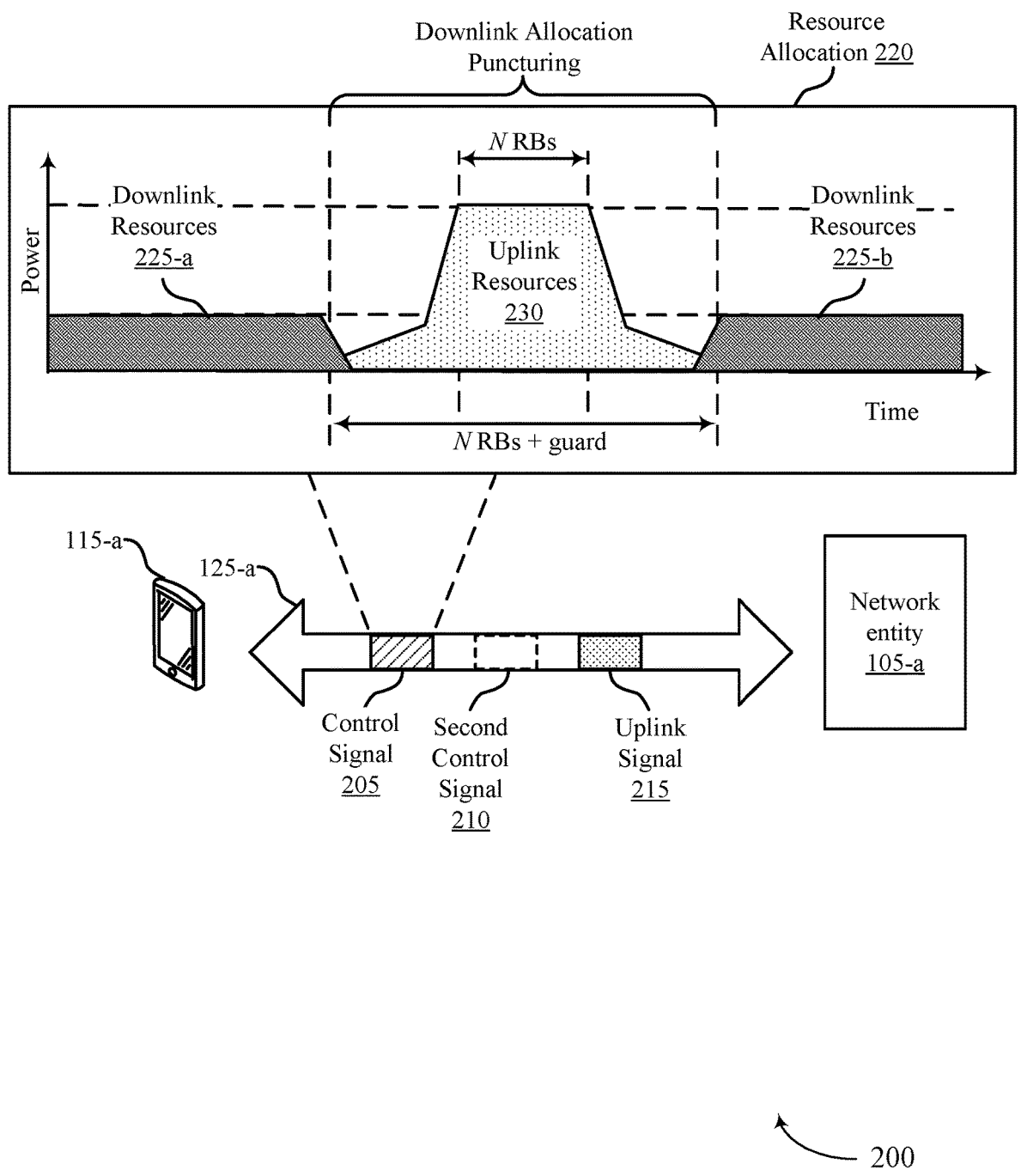
FIG. 2 illustrates an example of a wireless communications system that supports signaling for enabling full-duplex communications in the presence of a timing advance in accordance with one or more aspects of the present disclosure.

FIG. 2 illustrates an example of a wireless communications system 200 that supports signaling for enabling full-duplex communications in the presence of a timing advance in accordance with one or more aspects of the present disclosure. The wireless communications system 200 may include a UE 115-a and a network entity 105-a, which may be examples of the UE 115 and the network entity 105 as described with reference to FIG. 1. In some cases, the network entity 105-a may allocate resources to the UE 115-a scheduling uplink and downlink communications in the presence of a timing advance, and the UE 115-a may exchange signaling to reduce interference (e.g., self-interference, interference that may be caused by the timing advance), improving downlink throughput, latency, and reliability for the scheduled uplink and downlink communications.

The UE 115-a may communicate with the network entity 105-a via a bidirectional communication link 125-a. In some examples, the UE 115-a may receive downlink data from the network entity 105-a. If the UE 115-a is in a FDD mode, the UE 115-a may transmit an uplink signal containing continuous uplink feedback control information while receiving downlink data from the network entity 105-a due to frequency separation between the downlink data and the uplink signal. However, if the UE 115-a is in a TDD mode, the UE 115-a may have challenges transmitting uplink feedback control information (e.g., relatively frequent uplink feedback control information) while receiving downlink data form the network entity 105-a.

For example, a UE 115-a in a TDD mode may receive a control signal 205 (e.g., DCI, RRC signaling, MAC-CE signaling) from the network entity 105-b. The control signal 205 may include a resource allocation 220 of a set of downlink resources (e.g., downlink resources 225-a, downlink resources 225-b) and a set of uplink resources (e.g., uplink resources 230). In some TDD deployments, the UE 115-a may provide near-continuous uplink feedback control information by using a relatively small quantity of resource blocks (e.g., N RBs) for the feedback control information, where resource blocks for uplink transmissions puncture a relatively larger quantity of resource blocks allocated for receiving the downlink data (which may be referred to as downlink allocation puncturing or other similar terminology). For instance, in the resource allocation 220, the uplink resources 230 may be allocated at a middle or center of the downlink allocation (e.g., between the downlink resources 225-a and the downlink resources 225-b). In some aspects, the set of uplink resources may include a quantity of resource blocks (e.g., the N RBs) and a quantity of additional resource blocks allocated as guard resources between the uplink and downlink resources. The resource blocks of the uplink resources 230 may carry uplink control feedback instead of downlink information. The UE 115-a may generate an uplink signal 215 that contains the uplink feedback control information and transmit the uplink signal 215 using the uplink resources 230.

Because the uplink resources 230 puncture the downlink resources 225, the UE 115-a operating in the TDD mode may send relatively frequent transmissions including uplink feedback control information to the network entity 105-a. For instance, the UE 115-a may transmit beam management reporting, channel state feedback reporting, HARQ-ACK reporting, beam failure recovery requests, other feedback information, or a combination thereof, to the network entity 105-a using the uplink resources 230. Although the UE 115-a operating in the TDD mode may perform downlink and uplink communications using different sub-carriers, the UE 115-a may perform downlink and uplink communications on a same radio frequency spectrum band.

As depicted in FIG. 2, the UE 115-a may transmit the uplink signal 215 on the uplink resources 230 using a relatively higher amount of power compared to the power associated with reception of the downlink transmissions on the downlink resources 225. In some cases, a power gap between the transmission power associated with the uplink resources 230 and the reception power associated with the downlink resources 225 may result in interference between the uplink and downlink communications. For example, the relatively higher power associated with the uplink signal 215 on the uplink resources 230 may saturate reception components of the UE 115-a, causing the uplink signal 215 on the uplink resources 230 to interfere with downlink communications received on the downlink resources 225.

In some cases, the uplink signal 215 on the uplink resources 230 may leak into (e.g., interfere with) the downlink resources 225-a and/or the downlink resources 225-b, causing the uplink signal 215 to interfere with downlink data transmitted by the network entity 105-a. For example, the network entity 105-a may utilize a timing advance (e.g., a timing offset between downlink communication and uplink communication at the UE 115-a) to synchronize the uplink signal 215 and downlink data from the perspective of the network entity 105-a. Although the timing advance may result in synchronization of the uplink signal 215 and downlink data from the perspective of the network entity 105-a, the timing advance may cause a timing mismatch (e.g., time difference) between the uplink signal 215 and the downlink data from the perspective of the UE 115-a. Accordingly, the timing mismatch (and hence, the timing advance) may cause a loss of orthogonality between the uplink signal 215 and the downlink data for the UE 115-a when operating in a full duplex mode. Further, the loss of orthogonality may cause the uplink signal 215 to leak into the downlink resources 225-*a* and the downlink resources 225-*b* (e.g., in-band downlink resources). Additionally, or alternatively, the uplink signal 215 may be associated with non-linearity effects resulting from components of the UE 115-*a* (e.g., non-linearity effects from power amplifiers at the UE 115-*a*). Such non-linearity effects associated with the uplink signal 215 may cause the uplink signal 215 to leak into the in-band downlink resources 225-*a* and the downlink resources 225-*b*.

As described herein, the UE 115-*a* may mitigate a loss of orthogonality between uplink and transmissions resulting from the timing advance implemented by the network entity 105-*a* by adding dedicated tones to the uplink signal 215, where the dedicated tones may suppress the impact of the loss of orthogonality. The dedicated tones may be referred to as cancelation tones, active cancelation tones, or some similar terminology. In some examples, the UE 115-*a* may be aware of the timing mismatch between uplink and downlink communications (e.g., between the uplink signal 215 and a portion of a downlink signal) resulting from a value of the timing advance. Accordingly, the UE 115-*a* may determine (e.g., calculate) optimal cancelation tones to suppress the interference resulting from the loss of orthogonality. Here, the UE 115-*a* may determine how/how much the uplink feedback control information may affect downlink reception based on the value of the timing advance, and the UE 115-*a* may accordingly generate the one or more cancelation tones to be included in the uplink signal 215 for mitigating the effect of the feedback control information on downlink signals received via the downlink resources 225.

For example, the UE 115-*a* may receive the control signal 205 containing the resource allocation 220 that includes the downlink resources 225 and the uplink resources 230, where the uplink resources 230 puncture the downlink resources 225 and are allocated for transmitting feedback control information to the network entity 105-*a*. Additionally, the UE 115-*a* may generate the uplink signal 215, where the uplink signal contains the feedback control information and one or more cancelation tones. The one or more cancelation tones included in the uplink signal 215 may cancel interference between a portion of a downlink signal and the uplink signal 215. In some examples, the one or more cancelation tones may not carry data or information, but may be constructed to enable active tone cancellation for the data included in the feedback control information.

In some examples, a quantity of resources allocated for the one or more cancelation tones of the feedback control information (e.g., the cancelation tones included with the feedback control information), a location of the resources allocated for the one or more cancelation tones and the feedback control information, or both, may be based on the uplink resources 230 included in the resource allocation 220. For instance, the network entity 105-*a* may determine the resource allocation 220 of the uplink resources 230 and the downlink resources 225, and the network entity 105-*a* may further configure some number of resources (e.g., resource elements, resource blocks) and a location of the resources that may be used by the UE 115-*a* to transmit the uplink signal 215 (e.g., including the feedback control information and the one or more cancelation tones). In some examples, the location of the resources for the cancelation tones and the feedback control information may be associated with and/or be indicated by an index or other value. A first location and a first quantity of resource elements of the uplink resources 230 may be allocated for the feedback control information, and a second location and a second quantity of resource elements of the uplink resources 230 may be allocated for the one or more cancelation tones. Based on the uplink resources 230 in the resource allocation 220, the quantity and/or location of the resources allocated for the one or more cancelation tones and the feedback control information may be predetermined. For example, in accordance with the uplink resources 230 of the resource allocation 220 determined by the network entity 105-*b*, some quantity of center resource blocks of the uplink resources 230 (e.g., two resource blocks) may be predetermined to be allocated for the one or more cancelation tones and the feedback control information in the uplink signal 215. In this example, a first resource block of the two center resource blocks may be allocated for feedback control information, and a second resource block of the two center resource blocks may be allocated for the one or more cancelation tones, or vice versa. Other quantities and locations of resource blocks and/or resource elements for the feedback control information and the one or more cancelation tones are possible, and the examples provided herein are for illustrative purposes.

In some aspects, the UE 115-*a* may receive signaling from the network entity 105-*a* indicating the predetermined location and/or quantity of resources of the uplink resources 230 allocated for the one or more cancelation tones and the feedback control information. For example, the UE 115-*a* may receive a second control signal 210 from the network entity 105-*a* via DCI, RRC signaling, MAC control element (MAC-CE) signaling, or a combination thereof. Based on the uplink resources 230 indicated in the control signal 205, the second control signal 210 may indicate the quantity and/or location of resources allocated for the one or more cancelation tones and the feedback control information.

In some aspects, the UE 115-*a* may determine (e.g., dynamically determine) the location and/or quantity of resources (e.g., resource elements) of the uplink resources 230 allocated for feedback control and active tone cancelation based on a timing advance value. For instance, the network entity 105-*a* may configure the UE 115-*a* with a timing advance to synchronize the uplink signal 215 with a downlink signal from the perspective of the network entity 105-*a*, preventing collisions and interference between the uplink signal 215 and the downlink signal at the network entity 105-*a*. In some examples, the network entity 105-*a* may transmit a message (e.g., a MAC-CE) to the UE 115-*a* indicating a specific timing advance value which the UE 115-*a* should use to transmit the uplink signal 215. In accordance with the timing advance value configured for the UE 115-*a*, the uplink signal 215 may arrive at the network entity 105-*a* at a time desired by the network entity 105-*a*. Although the timing advance value configured for the UE 115-*a* may reduce interference between the uplink signal 215 and the downlink signal at the network entity 105-*a*, the timing advance value may cause a timing mismatch for the uplink signal 215 and the downlink signal from the perspective of the UE 115-*a*. Because the UE 115-*a* may be aware of the timing mismatch between the uplink signal 215 and the downlink signal received at the UE 115-*a*, the UE 115-*a* may determine the location and/or quantity of the feedback control resources and the active tone cancelation resources in accordance with the timing advance value configured by the network entity 105-*a*. Accordingly, the UE 115-*a* may generate the one or more cancelation tones to add to the uplink signal 215 based on the timing advance value, where the UE 115-*a* may calculated one or more values (e.g., frequency values) of the one or more cancelation tones based on the timing advance value. By generating the one or more cancelation tones for the uplink signal 215 based on the timing mismatch, and hence, the timing advance value, the UE 115-*a* may cancel interference between at least a portion of the downlink signal transmitted by the network entity 105-*a* and the uplink signal 215.

In some aspects, the UE 115-*a* may dynamically receive signaling from the network entity 105-*a* indicating the location and/or quantity of resources for the one or more cancelation tones included in the uplink signal 215. For instance, in some cases (e.g., due to interference considerations for components of the UE 115-*a*), the network entity 105-*a* may non-symmetrically allocate a location and quantity of resources for the cancelation tones non-symmetrically such that a first portion of the uplink signal 215 is suppressed by the cancelation tones more than a second portion of the uplink signal 215. Accordingly, if the network entity 105-*a* allocates a first location and a first quantity of resources of the uplink resources 230 for feedback control information, and if the network entity 105-*a* also allocates a second location and a second quantity of resources of the uplink resources 230 for the one or more cancelation tones, the network entity 105-*a* may dynamically suppress the uplink signal 215 by indicating to the UE 115-*a* the second quantity and the second location of resources of the uplink resources 230. For example, the network entity 105-*a* may transmit signaling indicating that the first two resource elements of the uplink resources 230 are allocated for two cancelation tones (e.g., one cancelation tone per resource element, two cancelation tones in one of the two resource elements).

In some examples, the UE 115-*a* may request a quantity of resources of the uplink resources 230 for the one or more cancelation tones, and the network entity 105-*a* may allocate the requested quantity of resources for the one or more cancelation tones within the second control signal 210. For instance, the UE 115-*a* may transmit a request message to the network entity 105-*a*, where the request message indicates a requested quantity of resources (e.g., resource elements) of the uplink resources 230 for the one or more cancelation tones. In some cases, the UE 115-*a* may request the quantity of resources for the one or more cancelation tones based on an amount of transmission and reception isolation present at the UE 115-*a*. For instance, if there is a relatively high level of isolation between uplink and downlink communications at the UE 115-*a*, then the UE 115-*a* may experience minimal interference between the uplink and downlink communications. In such cases, the UE 115-*a* may request a relatively smaller quantity of resources for the cancelation tones to suppress the minimal interference. Alternatively, if there is a relatively low level of isolation between uplink and downlink communications at the UE 115-*a*, then the UE 115-*a* may experience interference between the uplink and downlink communications. In such cases, the UE 115-*a* may request a relatively larger quantity of resources for the cancelation tones to suppress the substantial interference.

In some aspects, the UE 115-*a* may determine the requested quantity of resources for the one or more cancelation tones based on one or more capabilities (e.g., filtering capabilities, non-linear interference cancellation capabilities) of the UE 115-*a*. For example, the UE 115-*a* may request a relatively large quantity of resources for the cancelation tones if the UE 115-*a* has limited filtering capabilities, because the limited filtering capabilities of the UE 115-*a* may result in greater interference between uplink and downlink communications. Alternatively, the UE 115-*a* may request a relatively small quantity of resources for the cancelation tones if the UE 115-*a* has enhanced filtering capabilities, because the filtering capabilities of the UE 115-*a* may result in relatively less interference between uplink and downlink communications. Because the UE 115-*a* may determine the requested quantity of resources for the one or more cancelation tones based on capabilities of the UE 115-*a*, the UE 115-*a* may statically transmit a request message indicating the requested quantity. The UE 115-*a* may statically transmit the request message indicating the requested quantity of resources (e.g., resource elements) for the one or more cancelation tones via uplink control information signaling, RRC signaling, MAC-CE signaling, or a combination thereof. In some examples, the requested quantity of resources may be indicated via capability signaling from the UE 115-*a*.

In some aspects, the UE 115-*a* may determine the requested quantity of resources for the one or more cancelation tones based on a signal-to-noise ratio at the UE 115-*a*. For example, in some cases, the UE 115-*a* may perform beam management to select one or more directional beams (e.g., a beam pair) to transmit and receive signals. In such cases, the one or more directional beams selected by the UE 115-*a* may impact the separation of transmitted and received signals on a frequency and/or time domain associated with the selected directional beams, hence impacting the amount of interference between the transmitted and received signals on the selected directional beams. In some examples, the UE 115-*a* may measure and/or determine the SNR upon processing the transmitted and received signals on the selected directional beams to determine the amount of interference between the transmitted and received signals. Accordingly, the UE 115-*a* may determine a level of suppression, and hence, a quantity of resources for cancelation tones that may be used to suppress interference on the selected directional beams by a desired amount.

In some implementations, the UE 115-*a* may restore orthogonality between a downlink signal transmitted by the network entity 105-*a* and an uplink signal 215 that is transmitted in accordance with a timing advance value configured by the network entity 105-*a* by cyclically extending one or more uplink symbols of the uplink signal 215 in accordance with the timing advance value. By cyclically extending the one or more uplink symbols of the uplink signal 215 in accordance with the timing advance value, the UE 115-*a* may improve alignment between one or more boundaries of one or more downlink symbols of a downlink signal and one or more boundaries of the one or more uplink symbols of the uplink signal 215. Accordingly, the UE 115-*a* may at least partially eliminate the timing mismatch caused by a timing advance, reducing or eliminating interference between the uplink signal 215 and at least a portion of the downlink signal.

For example, the UE 115-*a* may receive the control signal 205 allocating the uplink resources 230 for transmitting feedback control information and allocating the downlink resources 225 for receiving downlink communications. The network entity 105-*a* may receive a message from the network entity 105-*a* indicating the timing advance value for transmitting the uplink signal 215. The uplink signal 215 may include at least a first symbol and a second symbol. In accordance with the indicated timing advance value, the UE 115-*a* may determine the size of a first cyclic extension to be appended to the first uplink symbol and the size of a second cyclic extension to be appended to the second uplink symbol. The UE 115-*a* may append the first and second cyclic extensions to the first and second uplink symbols such that synchronization between the uplink signal 215 and at least a portion of the downlink signal is improved. Accordingly, the UE 115-*a* may experience less timing mismatch from the timing advance implemented by the network entity 105-*a*, reducing interference between the uplink signal 215 and at least a portion of the downlink signal. Techniques for implementing the cyclic extensions of the uplink symbols may be described in more detail with reference to FIG. 4.

Figure 3:
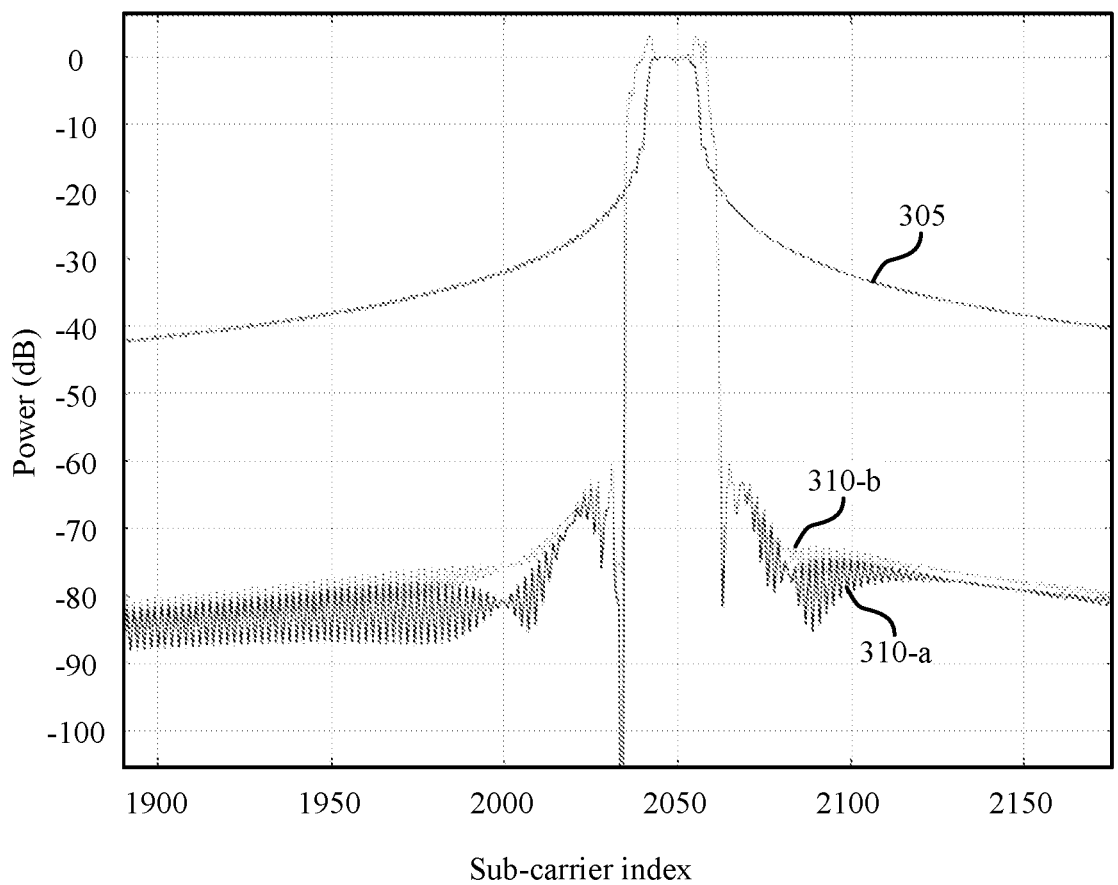
FIG. 3 illustrates an example of active tone cancelation effects that support signaling for enabling full-duplex communications in the presence of a timing advance in accordance with one or more aspects of the present disclosure.

FIG. 3 illustrates an example of active tone cancelation effects 300 that support signaling for enabling full-duplex communications in the presence of a timing advance in accordance with one or more aspects of the present disclosure. The active tone cancelation effect 300 may be implemented by a UE 115 and a network entity 105 as described with reference to FIGS. 1 and 2. In some cases, the network entity 105 may allocate resources to the UE 115 scheduling uplink and downlink communications in the presence of a timing advance, and the UE 115 may add one or more active cancelation tones to an uplink signal to suppress interference caused by the timing advance.

As described with reference to FIG. 2, the network entity 105 may configure the UE 115 with a set of downlink resources for receiving downlink data and a set of uplink resources for transmitting an uplink signal, where the set of uplink resources punctures the set of downlink resources. Additionally, the network entity 105 may configure the UE 115 with a timing advance to synchronize uplink and downlink communications from the perspective of the network entity 105, and the configured timing advance may cause a timing mismatch between the uplink and downlink communications from the perspective of the UE 115. As a result of the timing mismatch for the uplink and downlink communications caused by the configured timing advance, there may be a loss of orthogonality between the uplink and downlink communications at the UE 115. Due to the loss of orthogonality, an uplink signal transmitted by the UE 115 may leak into the set of downlink resources allocated by the network entity 105 for receiving downlink data, creating interference on the downlink signal.

The active tone cancelation effects 300 may illustrate the interference level that may be created by an uplink signal on each of a set of downlink sub-carriers via a graph, where the y-axis of the graph represents an interference level in dB relative to an original uplink signal power and the x-axis of the graph represents a downlink sub-carrier index. For instance, the UE 115 may transmit an original signal with no signal shaping (e.g., without adding dedication cancelation tones) on a quantity of resource blocks (e.g., 12 center resource blocks) allocated by the network entity 105. In this example, the original signal may be a one-resource block uplink signal with a subcarrier spacing of 30 kHz, and the original signal may include feedback control information in the absence of cancelation tones. In some cases, as a result of a timing advance configured for the UE 115, the 12 center resource blocks of the original signal may leak into resource blocks allocated for receiving downlink data (e.g., a portion of a set of downlink resources) from the network entity 105. The leakage of the original signal into the downlink resource blocks may be represented by an original signal interference curve 305, which displays a leakage signal power per sub-carrier index for the original signal. In some cases, the loss of orthogonality caused by the configured timing advance may cause the original signal to have interference ranging from 20 decibels relative to carrier (dBc) to −60 dBc, as shown in the original signal interference curve 305.

As described herein, the UE 115 may mitigate the loss of orthogonality between the uplink and downlink communications (e.g., between the uplink signal and the downlink data) by adding dedicated tones to the uplink communications to suppress the impact of the loss of orthogonality (e.g., to suppress the interference from leakage into the downlink allocated resource blocks). For instance, the UE 115 may perform signal shaping for the original signal by generating a tone reservation signal that includes tone reservation for one or more cancelation tones. The tone reservation signal may be an uplink signal that includes the feedback control information and one or more cancelation tones, where the one or more cancelation tones are added to suppress the interference created by a configured timing advance.

In some examples, the UE 115 may calculate the one or more cancelation tones based on a correct and accurate timing advance. The leakage of the tone reservation signal generated with correct timing advance may be represented by a tone reservation signal interference curve 310-a. In some cases, the tone reservation signal generated with correct timing advance may reduce interference by 40 dB in comparison to the original signal. For instance, in resource elements relatively more distant from the 12 center resource blocks, the original signal interference curve 305 may indicate a leakage signal power of approximately −60 dB while the tone reservation signal interference curve 310-a may indicate a leakage signal power of approximately −100 dB.

In some examples, the leakage signal power per sub-carrier respective to the tone reservation signal interference curve 310-a may be similar to the leakage signal power per sub-carrier respective to a tone reservation signal interference curve 310-b, where the tone reservation signal interference curve 310-a represents leakage from an uplink signal that is generated based on a correct and accurate timing advance, and the tone reservation signal interference curve 310-b represents leakage from an uplink signal that is generated based on an incorrect timing advance. Accordingly, techniques using tone reservation signal interference curve 310-b (e.g., containing the feedback control information and the one or more cancelation tones in accordance with the timing advance) may not be affected by relatively small errors in a timing advance configured by the network entity 105.

Figure 4:
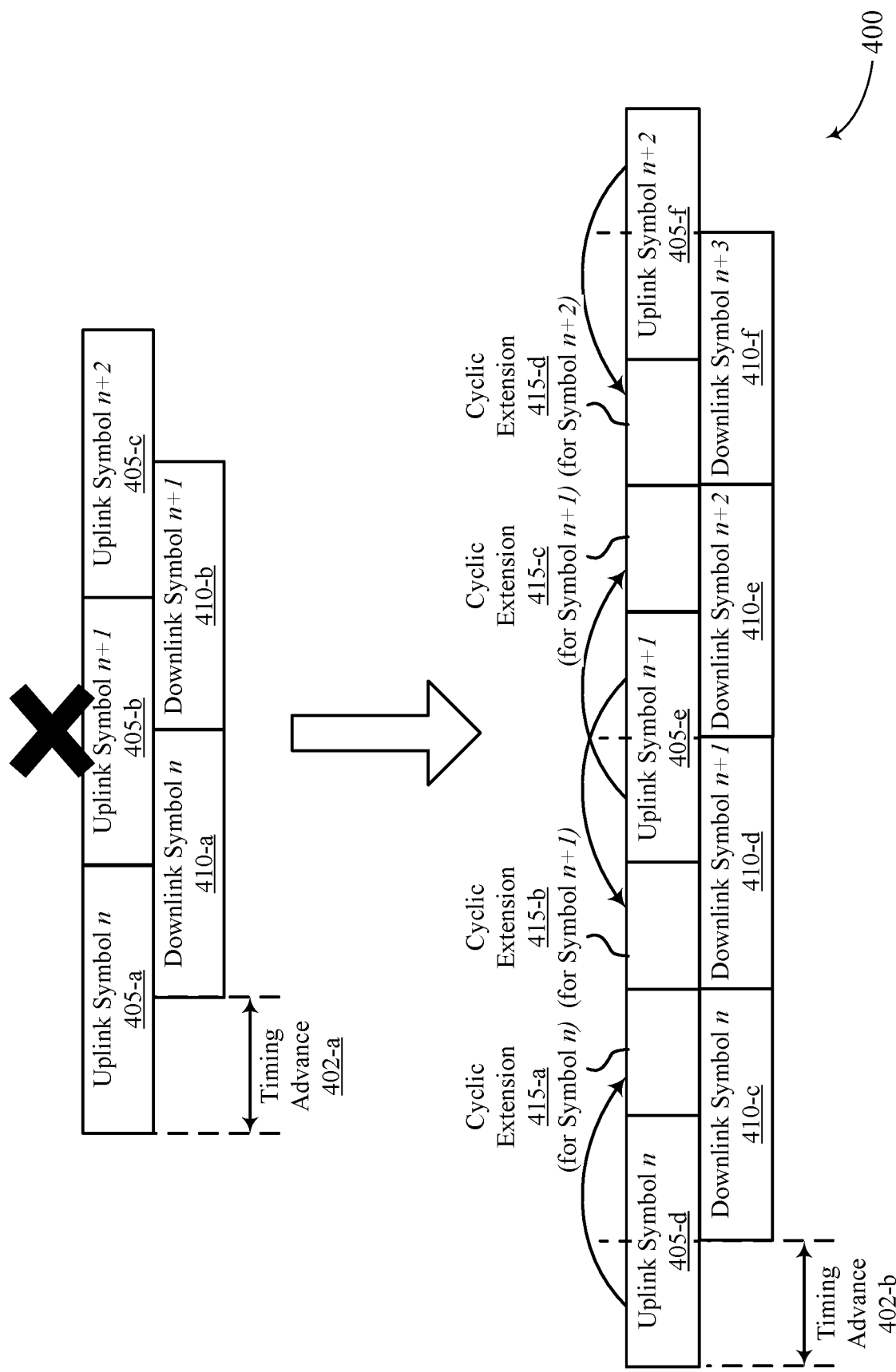
FIG. 4 illustrates an example of a cyclic extension scheme that supports signaling for enabling full-duplex communications in the presence of a timing advance in accordance with one or more aspects of the present disclosure.

FIG. 4 illustrates an example of a cyclic extension scheme 400 that supports signaling for enabling full-duplex communications in the presence of a timing advance in accordance with one or more aspects of the present disclosure. The cyclic extension scheme 400 may be implemented by a UE 115 and a network entity 105 as described with reference to FIGS. 1 and 2. In some cases, the network entity 105 may allocate uplink and downlink resources to the UE 115 scheduling communications in the presence of a timing advance 402 (e.g., timing advance 402-a, timing advance 402-b), and the UE 115 may cyclically extend uplink symbols of the uplink resources to reduce interference that may be caused by the timing advance 402, improving downlink throughput, latency, and reliability for the scheduled communications.

As described with reference to FIG. 2, the network entity 105 may configure the UE 115 with a value of the timing advance 402 (e.g., a timing advance value) to synchronize uplink and downlink communications from the perspective of the network entity 105, which may cause a timing mismatch between the uplink and downlink communications from the perspective of the UE 115. For example, the network entity 105 may allocate a set of downlink resources to the UE 115 for receiving downlink communication (e.g., downlink data transmissions), and the network entity 105 may also allocate a set of uplink resources to the UE 115 for transmitting feedback control information. The allocation of the set of downlink resources and the set of uplink resources may be allocated in a control signal transmitted from the network entity 105 and received by the UE 115.

In some cases, the UE 115 may transmit an uplink signal that includes the feedback control information while receiving downlink data from the network entity 105. For instance, the set of uplink resources allocated by the network entity 105 for transmitting the feedback control information may include an uplink symbol 405-a, an uplink symbol 405-b, and an uplink symbol 405-c. Additionally, a portion of the set of downlink resources allocated by the network entity 105 for receiving downlink data may include a downlink symbol 410-a and a downlink symbol 410-b. In some cases, the timing advance 402-a implemented by the network entity 105 may cause a timing mismatch between the uplink symbols 405-a, 405-b, and 405-c and the downlink symbols 410-a and 410-b. Accordingly one or more boundaries of each of the uplink symbols 405-a, 405-b, and 405-c may be misaligned with one or more boundaries of each of the downlink symbols 410-a and 410-b, contributing to a loss of orthogonality between the uplink signal and the downlink data.

In some examples, the UE 115 may determine that the uplink symbol 405-a has a symbol index of n, the uplink symbol 405-b has a symbol index of n+1, and the uplink symbol 405-c has a symbol of n+2. Additionally, the UE 115 may determine that the downlink symbol 410-a has a symbol index of n and that the downlink symbol has a symbol index of n+1. As a result, the uplink symbol n (e.g., uplink symbol 405-a) and the downlink symbol n (e.g., downlink symbol 410-a) may be misaligned in time, resulting in a loss of orthogonality between full-duplex uplink and downlink communications performed by the UE 115, such as when feedback control information is transmitted using a set of uplink resources that puncture a set of downlink resources. The loss of orthogonality between the full-duplex uplink and downlink communications may create interference (e.g., interference between uplink and downlink) that compromises the full-duplex uplink and/or downlink communications. In such cases, different portions of respective uplink symbols 405 may overlap in time with a single downlink symbol 410, which may require complex interference cancelation procedures at the UE 115.

To restore orthogonality between the uplink signal transmitted by the UE 115 and the downlink data received by the UE 115, the UE 115 may cyclically extend the uplink symbols 405 based on the timing advance 402-b (e.g., a value of the timing advance 402-b) configured for the UE 115, such that the information included in the uplink signal and the downlink data are relatively synchronized and orthogonal with respect to one another. In such cases, the UE 115 may refrain from transmitting each alternate (e.g., every other, every second) uplink symbol 405 (e.g., denoted by the "X" over the uplink symbol 405-b) of the set of uplink resources and instead transmit one or more cyclic extensions in place of the respective uplink symbol.

For example, the UE 115 may receive downlink data on a portion of the downlink resources allocated by network entity 105 such that the portion of the downlink resources includes a downlink symbol 410-c, a downlink symbol 410-d, a downlink symbol 410-e, and a downlink symbol 410-f. Additionally, the UE 115 may generate an uplink signal including the feedback control information such that the set of uplink resources includes an uplink symbol 405-d, a cyclic extension 415-a of the uplink symbol 405-d, a cyclic extension 415-b of an uplink symbol 405-e, the uplink symbol 405-e, another cyclic extension 415-c of the uplink symbol 405-e, a cyclic extension 415-d of an uplink symbol 405-f, and the uplink symbol 405-f.

As depicted in FIG. 4, the downlink symbol 410-c of the portion of the allocated set of downlink resources may overlap in time with the cyclic extension 415-a and a portion of the uplink symbol 405-d. Likewise, the downlink symbol 410-d of the portion of the allocated set of downlink resources may overlap in time with the cyclic extension 415-b and a portion of the uplink symbol 405-e, and the downlink symbol 410-e of the portion of the allocated set of downlink resources may overlap in time with the cyclic extension 415-c and a portion of the uplink symbol 405-e. Further, the downlink symbol 410-f of the portion of the allocated set of downlink resources may overlap in time with the cyclic extension 415-d and a portion of the uplink symbol 405-f. The location and size of the respective cyclic extensions 415 may result in improved cancellation and mitigation of interference between the uplink and downlink symbols. More specifically, with the inclusion of the cyclic extensions 415, the UE 115 may fully transmit uplink information (corresponding to the original contents of one uplink symbol 405) over a duration of a corresponding downlink symbol 410, which may enable the UE 115 to eliminate uplink interference from a downlink sub-carrier. More specifically, through the inclusion of the respective cyclic extensions 415, within the timing boundaries of each downlink symbol 410 there may be a complete, cyclically-shifted version of a complete uplink symbol 405 that may enable the reduction or elimination of interference. For instance, the downlink symbol 410-c corresponds to a complete, cyclically-shifted version of uplink symbol 405-d. Similarly, downlink symbol 410-d corresponds to a complete, cyclically-shifted version of uplink symbol 405-e, downlink symbol 410-e corresponds to a complete, cyclically-shifted version of uplink symbol 405-e, and so forth.

The cyclic extensions 415-a, 415-b, 415-c, and 415-d may be appended to the uplink symbols 405-d, 405-e, and 405-f based on the timing advance 402-b configured for the UE 115. In some examples, the UE 115 may receive a message from the network entity 105 indicating a timing advance value for transmitting the uplink signal. Accordingly, the UE 115 may determine symbol indices respective to the uplink symbol 405-d, 405-e, and 405-f in accordance with the timing advance value. By accounting for the timing advance value configured by the network entity 105, the determined symbol indices for the uplink symbols 405-d, 405-e, and 405-f and the respective cyclic extensions 415-a, 415-b, 415-c, and 415-d may enable improved overlapping of the uplink data (e.g., the feedback control information) with the downlink symbols 410-c, 410-e, and 410-f, and thereby provide enhanced cancellation of interference on downlink data caused by uplink transmissions.

The UE 115 may determine (e.g., calculate, compute) a size of each cyclic extension 415 based on the timing advance 402-b. In particular, the UE 115 may determine a size of the cyclic extension 415-a based on the value of the timing advance 402-b. A size of a cyclic extension may correspond to a length of time, or duration, for which the uplink symbols 405 may be cyclically extended (e.g., periodically) based on the timing mismatch caused by the timing advance 402-b. In some cases, a cyclic extensions 415 may have a same size as the timing advance 402-b, but the timing advance value may result in the size of at least one cyclic extension 415 being different than the timing advance 402-b. Further, multiple (e.g., two) cyclic extensions may have a same size as a symbol period. As an example, a sum of a size of a first cyclic extension and a size of a second cyclic extension may be approximated to a symbol duration. For instance, size of the cyclic extension 415-a and the cyclic extension 415-*b* may collectively be equivalent to the size of an uplink symbol, such as the uplink symbol 405-*d*.

Because a boundary (e.g., the end) of the cyclic extension 415-*a* appended to the uplink symbol 405-*d* aligns with a boundary (e.g., the end) of the downlink symbol 410-*c*, the UE 115 may restore some orthogonality between the uplink signal associated with the uplink symbol 405-*d* and the downlink signal associated with the downlink symbol 410-*c*. Further, the cyclic extension 415-*a* may include data or information bits from the beginning (e.g., a beginning portion) of the uplink symbol 405-*d* that is non-overlapping with the downlink symbol 410-*c* (e.g., due to the timing advance 402-*b*), which may result in the full contents of the uplink symbol 405-*d* overlapping with the downlink symbol 410-*c*. For similar reasons, because a boundary (e.g., the beginning) of the cyclic extension 415-*b* appended to the beginning of the uplink symbol 405-*e* aligns with a boundary (e.g., the beginning) of the downlink symbol 410-*d*, the UE 115 restores some orthogonality between the uplink signal associated with the uplink symbol 405-*e* and the downlink signal associated with the downlink symbol 410-*d*. That is, the cyclic extension 415-*b* may include data or information bits from the beginning (e.g., a beginning portion) of the uplink symbol 405-*e* that is non-overlapping with the downlink symbol 410-*d* (e.g., due to the timing advance 402-*b*), which may result in the full contents of the uplink symbol 405-*e* overlapping with the downlink symbol 410-*d*.

Cyclic extensions 415 may be appended to uplink symbols 405 based on a location and/or index of the respective uplink symbols 405. For instance, the UE 115 may cyclically extend the beginning and/or end of the uplink symbols 405-*d*, 405-*e*, and 405-*f* by determining the locations of the cyclic extension 415 with respect to the symbol indices of the uplink symbols 405-*d*, 405-*e*, and 405-*f*. As illustrated, the UE 115 may append the cyclic extension 415-*a* and the cyclic extension 415-*c* to an end of the uplink symbol 405-*d* and the uplink symbol 405-*f*, respectively. Additionally, or alternatively, the UE 115 may append the cyclic extension 415-*b* and the cyclic extension 415-*d* to a beginning of the uplink symbol 405-*e* and an end of the uplink symbol 405-*f*, respectively. The uplink symbol 405-*e* including both leading and trailing cyclic extensions 415 may be a result of the uplink symbol 405-*e* being located (and having a corresponding index) between two other uplink symbols 405 (e.g., between uplink symbol 405-*d* and uplink symbol 405-*f*). Thus, the location of the cyclic extensions 415-*a*, 415-*b*, 415-*c*, and 415-*d* may be located at the beginning or the end of the uplink symbols 405-*d*, 405-*e*, and 405-*f*, respectively.

In some examples, the UE 115 may predict the timing mismatch between the uplink symbols 405 and the downlink symbols 410 based on the timing advance value indicated in a message received by the UE 115 from the network entity 105. Additionally, or alternatively, the UE 115 may be aware of the timing mismatch between the uplink symbols 405 and the downlink symbols 410 based on one or more previously-received downlink signals and/or previously transmitted uplink signals.

By generating an uplink signal including the feedback control information, where the uplink signal contains the uplink symbols 405-*d*, 405-*e*, and 405-*f*, as well as the cyclic extensions 415-*a*, 415-*b*, 415-*c*, and 415-*d*, the UE 115 may restore orthogonality between the uplink signal and the received downlink data, thereby improving uplink-to-downlink interference suppression at the UE 115 (e.g., as a result of the cyclic extension combined with fast Fourier Transform (FFT) operations performed for OFDM communications). Accordingly, the UE 115 may transmit the uplink signal including the feedback control information while receiving downlink data with reduced or nearly eliminated interference between the uplink signal and the downlink data.

Figure 5:
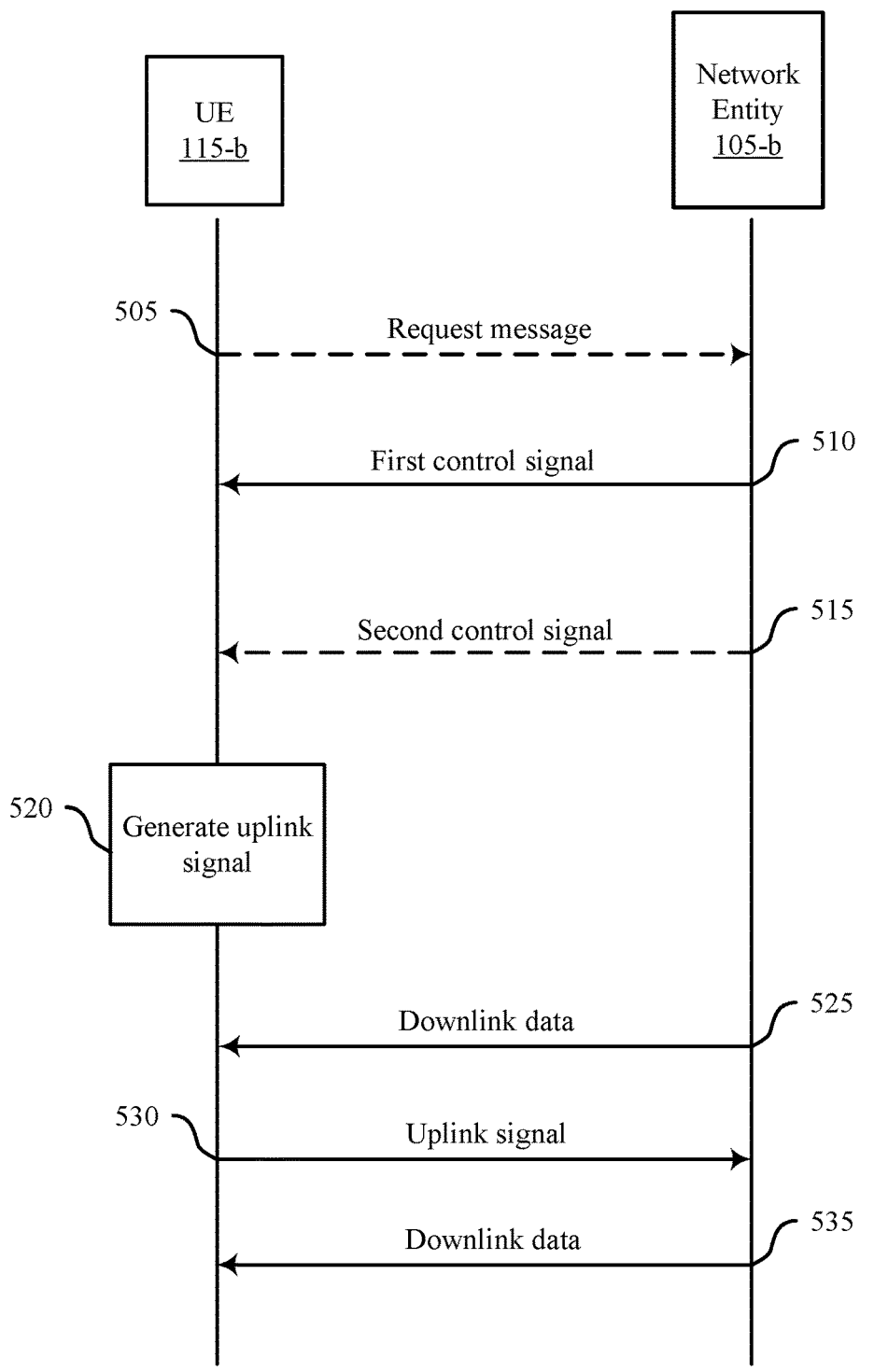
FIG. 5 illustrates an example of a process flow in a system that supports signaling for enabling full-duplex communications in the presence of a timing advance in accordance with one or more aspects of the present disclosure.

FIG. 5 illustrates an example of a process flow 500 in a system that supports signaling for enabling full-duplex communications in the presence of a timing advance in accordance with one or more aspects of the present disclosure. The process flow 500 may implement or be implemented by aspects of wireless communications systems 100 or 200. For example, the process flow 500 may illustrate operations between a UE 115-*b* and a network entity 105-*b*, which may be examples of a UE 115 and a network entity 105, as described with reference to FIG. 1 and FIG. 2. In the following description of the process flow 500, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 500, and other operations may be added to the process flow 500.

At 505, the UE 115-*b* may transmit, and the network entity 105-*b* may receive, a request message indicating a requested quantity of resources of a set of uplink resources allocated for one or more cancelation tones used to cancel interference between a portion of a downlink signal and an uplink signal. In some examples, the UE 115-*b* may determine the requested quantity of resources based on one or more capabilities (e.g., filtering capabilities, non-linear interference cancelation capabilities, or the like) of the UE 115-*b*. Additionally, or alternatively, the UE 115-*b* may determine the requested quantity of resources for the one or more cancelation tones based on one or more directional beams selected by the UE 115-*b*. Additionally, or alternatively, the UE 115-*b* may determine the requested quantity of resources for the one or more cancelation tones based on a SNR experienced at the UE 115-*b*. The UE 115-*b* may transmit the request message via uplink control information signaling, RRC signaling, MAC-CE signaling, or any combination thereof.

At 510, the network entity 105-*b* may transmit, and the UE 115-*b* may receive, a first control signal allocating a set of downlink resources and the set of uplink resources, where the set of uplink resources punctures the set of downlink resources and are allocated for transmitting feedback control information. A portion of the set of downlink resources may be allocated for the downlink signal, and the set of uplink resources may be allocated for the uplink signal.

In some examples, a quantity of the resources allocated for one or more cancelation tones and the feedback control information, a location of the resources allocated for the one or more cancelation tones and the feedback control information, or both, may be predetermined based on the set of uplink resources. In some examples, the quantity of resources allocated for the one or more cancelation tones may be based on the requested quantity of resources (e.g., at 505). Additionally, or alternatively, the quantity of resources allocated for the one or more cancelation tones, the location of the resources allocated for the one or more cancelation tones, or both, may be based on a timing advance value configured for the UE 115-*b*. In some examples, the set of uplink resources may include a first location of resource elements and a first quantity of resource elements allocated for the feedback control information. Additionally, or alternatively, the set of uplink resources may include a second location of resource elements and a second quantity of resource elements allocated for the one or more cancelation tones.

At 515, the network entity 105-*b* may transmit, and the UE 115-*b* may receive, a second control signal indicating the quantity of resources of the set of uplink resources allocated for the one or more cancelation tones and the feedback control information, the location of the resources of the set of uplink resources allocated for the one or more cancelation tones and the feedback control information, or any combination thereof. The network entity 105-*b* may transmit the second control signal via DCI signaling, RRC signaling, MAC-CE signaling, or any combination thereof.

In some implementations, the network entity 105-*b* may transmit, and the UE 115-*b* may receive, a message indicating the timing advance value for transmitting the uplink signal. For example, the network entity 105-*b* may configure the UE 115-*b* with a timing advance value by sending a timing advance value indication message to synchronize uplink and downlink communications from the perspective of the network entity 105-*b*.

At 520, the UE 115-*b* may generate an uplink signal containing the feedback control information and one or more cancelation tones for canceling interference between a portion of a downlink signal and the uplink signal, where the one or more cancelation tones are based on the feedback control information and the timing advance value. In some examples, the UE 115-*b* may generate the uplink signal based on the first control signal, the second control signal, or both. Additionally, or alternatively, the UE 115-*b* may generate the one or more cancelation tones based on the timing advance value, where one or more values of the one or more cancelation tones may be based on the timing advance value.

In some implementations, the network entity 105-*b* may generate an uplink signal containing the feedback control information, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol. The second uplink symbol may be different from the first uplink symbol. In some such implementations, the first downlink symbol of the portion of the set of downlink resources that is allocated for receiving downlink data may overlap in time with the first cyclic extension and a portion of the first uplink symbol. Additionally, or alternatively, a second downlink symbol of the portion of the set of downlink resources that is allocated for receiving downlink data may overlap in time with the second cyclic extension and a portion of the second uplink symbol, the second downlink symbol being different from the first downlink symbol.

In such implementations, a size of the first cyclic extension and a size of the second cyclic extension may be based on a timing advance value for transmitting the uplink signal. For example, the UE 115-*b* may determine the size of the first cyclic extension appended to the first uplink symbol and the size of the second cyclic extension appended to the second uplink symbol based on the timing advance value. That is, a size of the cyclic extensions (e.g., before and after a symbol) may be a function of the timing advance. Here, a size of one of the extensions may be equal to the timing advance value and a size of the other extension may be equal a difference between the symbol time and the timing advance. In some examples, the sum of the size of the first cyclic extension and the size of the second cyclic extension may be equal to a symbol (e.g., an OFDM symbol period).

As such, the size of the first cyclic extension and the size of the second cyclic extension may be the same or different. In some examples, the first cyclic extension may be at a beginning of the first uplink symbol, an end of the first uplink symbol, or both. For instance, the first cyclic extension of the first uplink symbol may be appended to an end of the first uplink symbol. Additionally, or alternatively, the second cyclic extension may be at a beginning of the second uplink symbol, an end of the second uplink symbol, or both. For instance, the second cyclic extension of the second uplink symbol may be appended to a beginning of the second uplink symbol.

At 525, the network entity 105-*b* may transmit, and the UE 115-*b* may receive, downlink data on a first set of resource blocks of a portion of the set of downlink resources.

At 530, the UE 115-*b* may transmit, and the network entity 105-*b* may receive, the uplink signal including the feedback control information using the set of uplink resources that punctures the set of downlink resources. In some implementations, the uplink signal may contain the feedback control information and one or more cancelation tones for canceling, or suppressing, interference between the portion of the downlink signal and the uplink signal. Additionally, or alternatively, the uplink signal may contain the feedback control information, where the uplink signal includes the first uplink symbol, the first cyclic extension of the first uplink symbol that is appended to the first uplink symbol, the second uplink symbol, and the second cyclic extension of the second uplink symbol that is appended to the second uplink symbol.

At 535, the network entity 105-*b* may transmit, and the UE 115-*b* may receive, downlink data on a second set of resource blocks of the portion of the set of downlink resources.

Accordingly, the UE 115-*b* may transmit, while receiving downlink data on a portion of the set of downlink resources (e.g., on the first and second set of resource blocks of the portion of the set of downlink resource blocks), the uplink signal including the feedback control information using the set of uplink resources.

Figure 6:
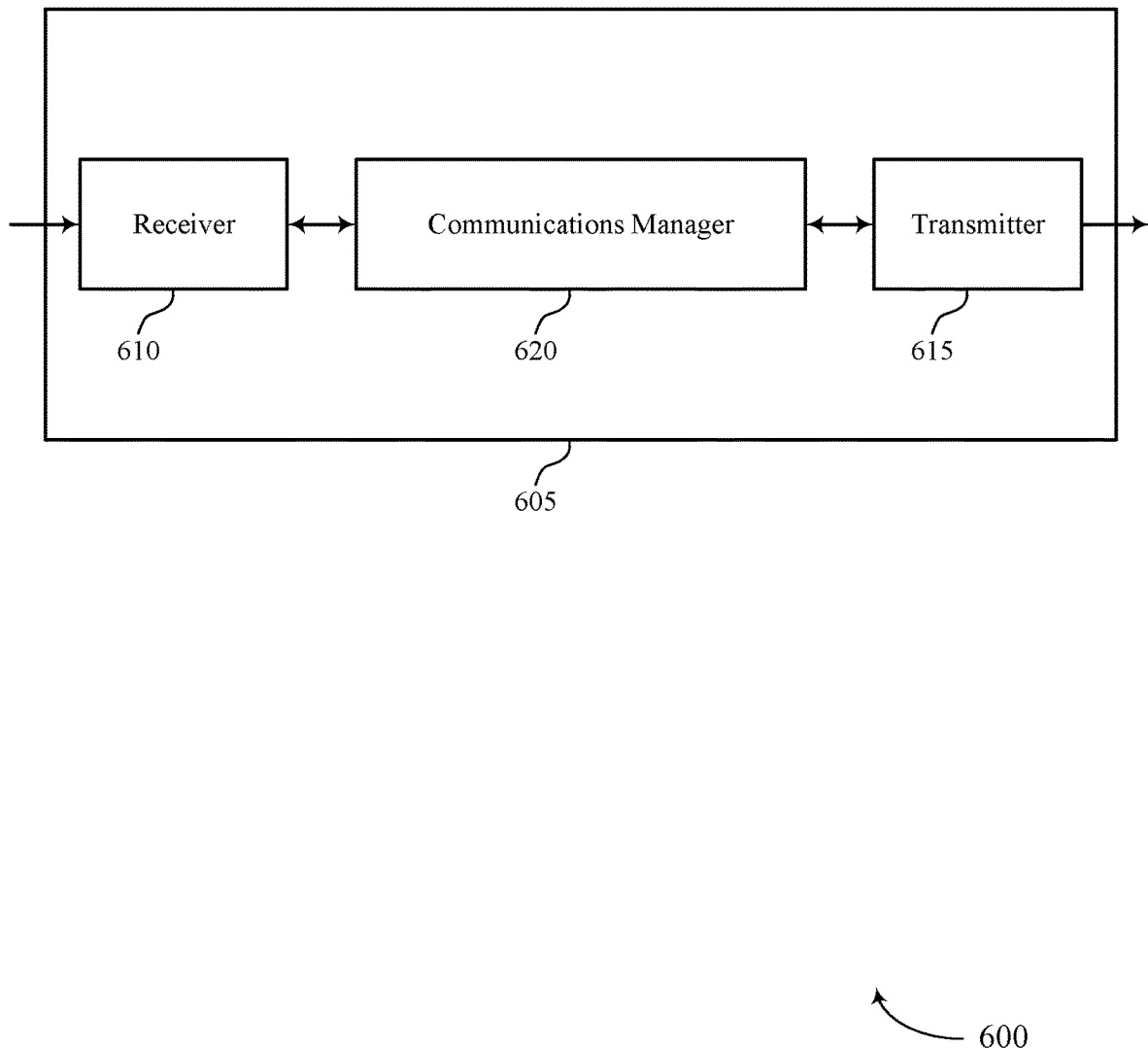
FIGS. 6 and 7 show block diagrams of devices that support signaling for enabling full-duplex communications in the presence of a timing advance in accordance with one or more aspects of the present disclosure.

FIG. 6 shows a block diagram 600 of a device 605 that supports signaling for enabling full-duplex communications in the presence of a timing advance in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling for enabling full-duplex communications in the presence of a timing advance). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling for enabling full-duplex communications in the presence of a timing advance). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of signaling for enabling full-duplex communications in the presence of a timing advance as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a control signal allocating a set of downlink resources and a set of uplink resources, where the set of uplink resources punctures the set of downlink resources and is allocated for transmitting feedback control information. The communications manager 620 may be configured as or otherwise support a means for generating an uplink signal including the feedback control information and one or more cancelation tones for canceling interference between a portion of a downlink signal and the uplink signal, the one or more cancelation tones being based on the feedback control information and a timing advance value. The communications manager 620 may be configured as or otherwise support a means for transmitting, while receiving the portion of the downlink signal on a portion of the set of downlink resources, the uplink signal including the feedback control information and the one or more cancelation tones using the set of uplink resources.

Additionally, or alternatively, the communications manager 620 may support wireless communication at a UE in accordance with examples as disclosed herein. For example, the communications manager 620 may be configured as or otherwise support a means for receiving a control signal allocating a set of downlink resources and a set of uplink resources, where the set of uplink resources punctures the set of downlink resources and is allocated for transmitting feedback control information. The communications manager 620 may be configured as or otherwise support a means for generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. The communications manager 620 may be configured as or otherwise support a means for transmitting, while receiving downlink data on a portion of the set of downlink resources, the uplink signal including the feedback control information using the set of uplink resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for higher reliability and more efficient utilization of communication resources.

Figure 7:
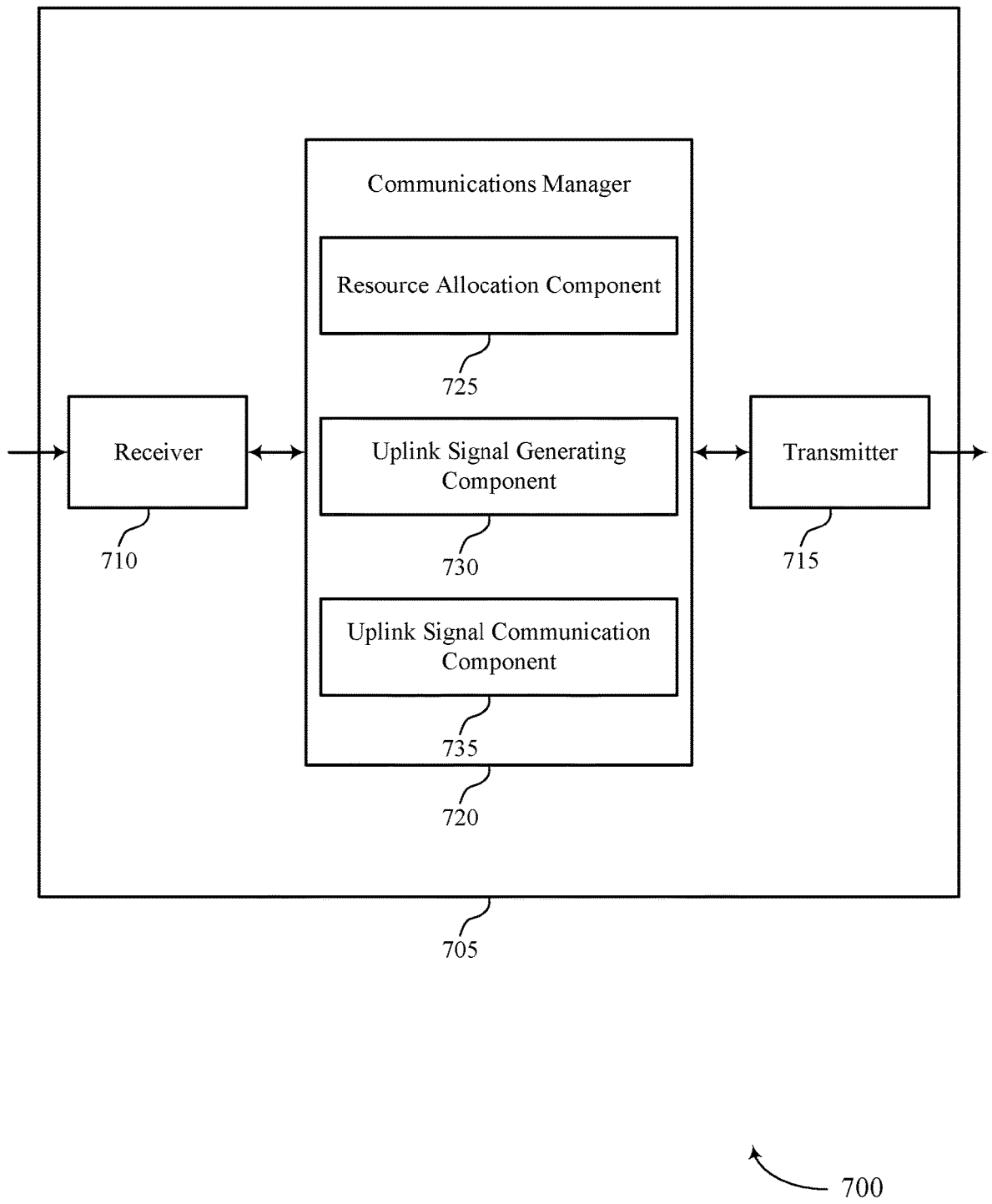

FIG. 7 shows a block diagram 700 of a device 705 that supports signaling for enabling full-duplex communications in the presence of a timing advance in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signaling for enabling full-duplex communications in the presence of a timing advance). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signaling for enabling full-duplex communications in the presence of a timing advance). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of signaling for enabling full-duplex communications in the presence of a timing advance as described herein. For example, the communications manager 720 may include a resource allocation component 725, an uplink signal generating component 730, an uplink signal communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The resource allocation component 725 may be configured as or otherwise support a means for receiving a control signal allocating a set of downlink resources and a set of uplink resources, where the set of uplink resources punctures the set of downlink resources and is allocated for transmitting feedback control information. The uplink signal generating component 730 may be configured as or otherwise support a means for generating an uplink signal including the feedback control information and one or more cancelation tones for canceling interference between a portion of a downlink signal and the uplink signal, the one or more cancelation tones being based on the feedback control information and a timing advance value. The uplink signal communication component 735 may be configured as or otherwise support a means for transmitting, while receiving the portion of the downlink signal on a portion of the set of downlink resources, the uplink signal including the feedback control information and the one or more cancelation tones using the set of uplink resources.

Additionally, or alternatively, the communications manager 720 may support wireless communication at a UE in accordance with examples as disclosed herein. The resource allocation component 725 may be configured as or otherwise support a means for receiving a control signal allocating a set of downlink resources and a set of uplink resources, where the set of uplink resources punctures the set of downlink resources and is allocated for transmitting feedback control information. The uplink signal generating component 730 may be configured as or otherwise support a means for generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. The uplink signal communication component 735 may be configured as or otherwise support a means for transmitting, while receiving downlink data on a portion of the set of downlink resources, the uplink signal including the feedback control information using the set of uplink resources.

Figure 8:
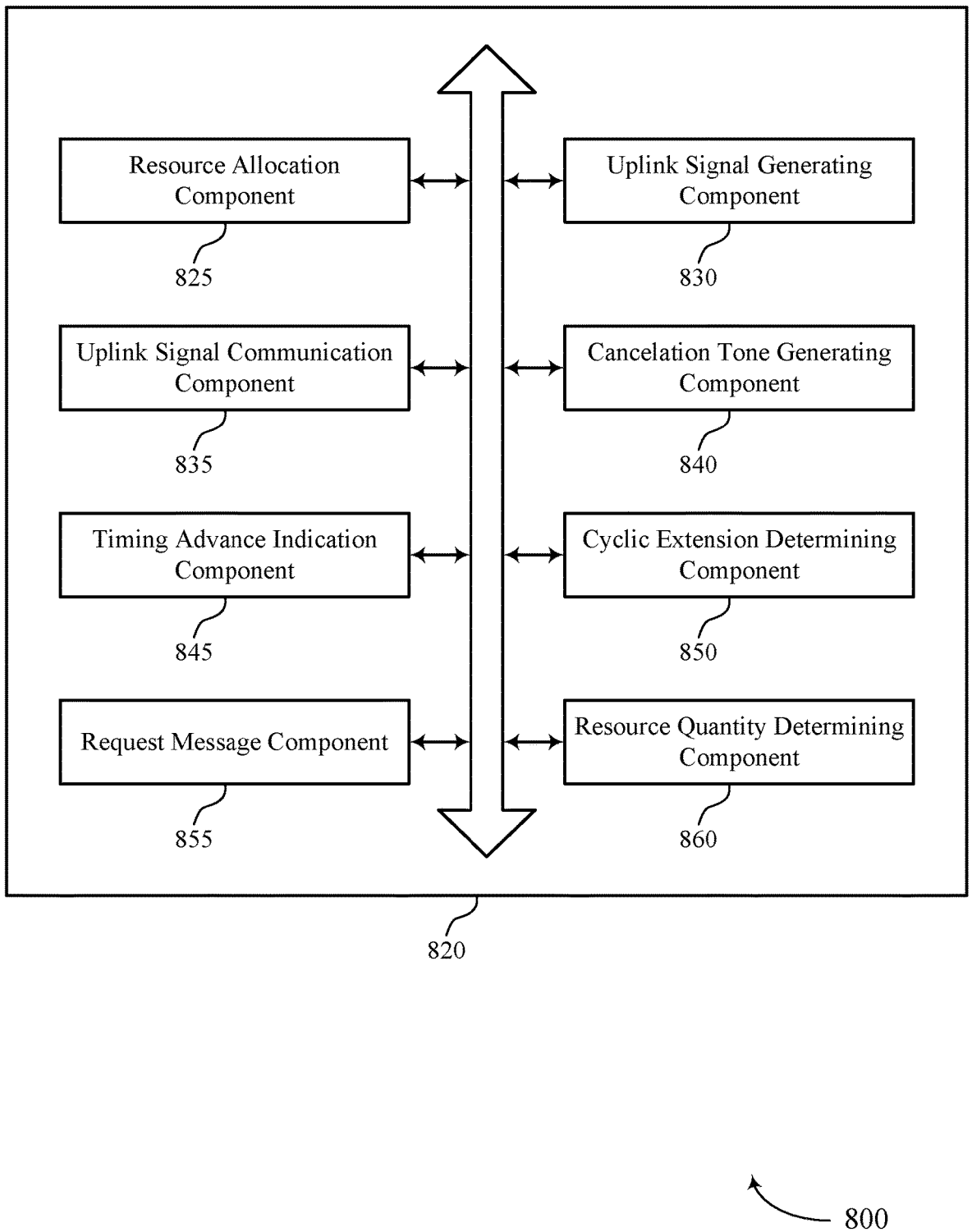
FIG. 8 shows a block diagram of a communications manager that supports signaling for enabling full-duplex communications in the presence of a timing advance in accordance with one or more aspects of the present disclosure.

FIG. 8 shows a block diagram 800 of a communications manager 820 that supports signaling for enabling full-duplex communications in the presence of a timing advance in accordance with one or more aspects of the present disclosure. The communications manager 820 may be an example of aspects of a communications manager 620, a communications manager 720, or both, as described herein. The communications manager 820, or various components thereof, may be an example of means for performing various aspects of signaling for enabling full-duplex communications in the presence of a timing advance as described herein. For example, the communications manager 820 may include a resource allocation component 825, an uplink signal generating component 830, an uplink signal communication component 835, a cancelation tone generating component 840, a timing advance indication component 845, a cyclic extension determining component 850, a request message component 855, a resource quantity determining component 860, or any combination thereof. Each of these components may communicate, directly or indirectly, with one another (e.g., via one or more buses).

The communications manager 820 may support wireless communication at a UE in accordance with examples as disclosed herein. The resource allocation component 825 may be configured as or otherwise support a means for receiving a control signal allocating a set of downlink resources and a set of uplink resources, where the set of uplink resources punctures the set of downlink resources and is allocated for transmitting feedback control information. The uplink signal generating component 830 may be configured as or otherwise support a means for generating an uplink signal including the feedback control information and one or more cancelation tones for canceling interference between a portion of a downlink signal and the uplink signal, the one or more cancelation tones being based on the feedback control information and a timing advance value. The uplink signal communication component 835 may be configured as or otherwise support a means for transmitting, while receiving the portion of the downlink signal on a portion of the set of downlink resources, the uplink signal including the feedback control information and the one or more cancelation tones using the set of uplink resources.

In some examples, the resource allocation component 825 may be configured as or otherwise support a means for receiving a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, where generating the uplink signal is based on the second control signal.

In some examples, the request message component 855 may be configured as or otherwise support a means for transmitting a request message indicating a requested quantity of resources of the set of uplink resources for the one or more cancelation tones, where the quantity of the resources allocated for the one or more cancelation tones is based on the requested quantity of resources.

In some examples, the resource quantity determining component 860 may be configured as or otherwise support a means for determining the requested quantity of resources based on one or more capabilities of the UE.

In some examples, the resource quantity determining component 860 may be configured as or otherwise support a means for determining the requested quantity of resources for the one or more cancelation tones based on one or more directional beams selected by the UE.

In some examples, the resource quantity determining component 860 may be configured as or otherwise support a means for determining the requested quantity of resources for the one or more cancelation tones based on a signal-to-noise ratio at the UE.

In some examples, the request message includes uplink control information signaling, radio resource control signaling, medium access control (MAC) control element (MAC-CE) signaling, or any combination thereof.

In some examples, the quantity of the resources allocated for the one or more cancelation tones and the feedback control information, the location of the resources allocated for the one or more cancelation tones and the feedback control information, or both, is predetermined and based on the set of uplink resources.

In some examples, the quantity of the resources allocated for the one or more cancelation tones, the location of the resources allocated for the one or more cancelation tones, or both, is based on the timing advance value.

In some examples, the second control signal includes downlink control information, radio resource control signaling, medium access control (MAC) control element (MAC-CE) signaling, or any combination thereof.

In some examples, the cancelation tone generating component 840 may be configured as or otherwise support a means for generating the one or more cancelation tones based on the timing advance value, where one or more values of the one or more cancelation tones are based on the timing advance value.

In some examples, the set of uplink resources includes a first location of resource elements and a first quantity of resource elements allocated for the feedback control information. In some examples, the set of uplink resources includes a second location of resource elements and a second quantity of resource elements allocated for the one or more cancelation tones.

Additionally, or alternatively, the communications manager 820 may support wireless communication at a UE in accordance with examples as disclosed herein. In some examples, the resource allocation component 825 may be configured as or otherwise support a means for receiving a control signal allocating a set of downlink resources and a set of uplink resources, where the set of uplink resources punctures the set of downlink resources and is allocated for transmitting feedback control information. In some examples, the uplink signal generating component 830 may be configured as or otherwise support a means for generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. In some examples, the uplink signal communication component 835 may be configured as or otherwise support a means for transmitting, while receiving downlink data on a portion of the set of downlink resources, the uplink signal including the feedback control information using the set of uplink resources.

In some examples, the timing advance indication component 845 may be configured as or otherwise support a means for receiving, from a network entity, a message indicating the timing advance value for transmitting the uplink signal. In some examples, the cyclic extension determining component 850 may be configured as or otherwise support a means for determining the size of the first cyclic extension appended to the first uplink symbol and the size of the second cyclic extension appended to the second uplink symbol based on the timing advance value.

In some examples, a sum of the size of the first cyclic extension and the size of the second cyclic extension includes a symbol.

In some examples, the timing advance indication component 845 may be configured as or otherwise support a means for receiving, from a network entity, a message indicating the timing advance value for transmitting the uplink signal. In some examples, the cyclic extension determining component 850 may be configured as or otherwise support a means for determining a location of the first cyclic extension appended to the first uplink symbol and a location of the second cyclic extension appended to the second uplink symbol based on the timing advance value and respective symbol indices of the first uplink symbol and the second uplink symbol.

In some examples, the location of the first cyclic extension includes a beginning of the first uplink symbol, an end of the first uplink symbol, or both.

In some examples, the location of the second cyclic extension includes a beginning of the second uplink symbol, an end of the second uplink symbol, or both.

In some examples, a first downlink symbol of the portion of the set of downlink resources overlaps in time with the first cyclic extension and a portion of the first uplink symbol. In some examples, a second downlink symbol of the portion of the set of downlink resources overlaps in time with the second cyclic extension and a portion of the second uplink symbol, the second downlink symbol being different from the first downlink symbol.

In some examples, the first cyclic extension of the first uplink symbol is appended to an end of the first uplink symbol.

In some examples, the second cyclic extension of the second uplink symbol is appended to a beginning of the second uplink symbol.

Figure 9:
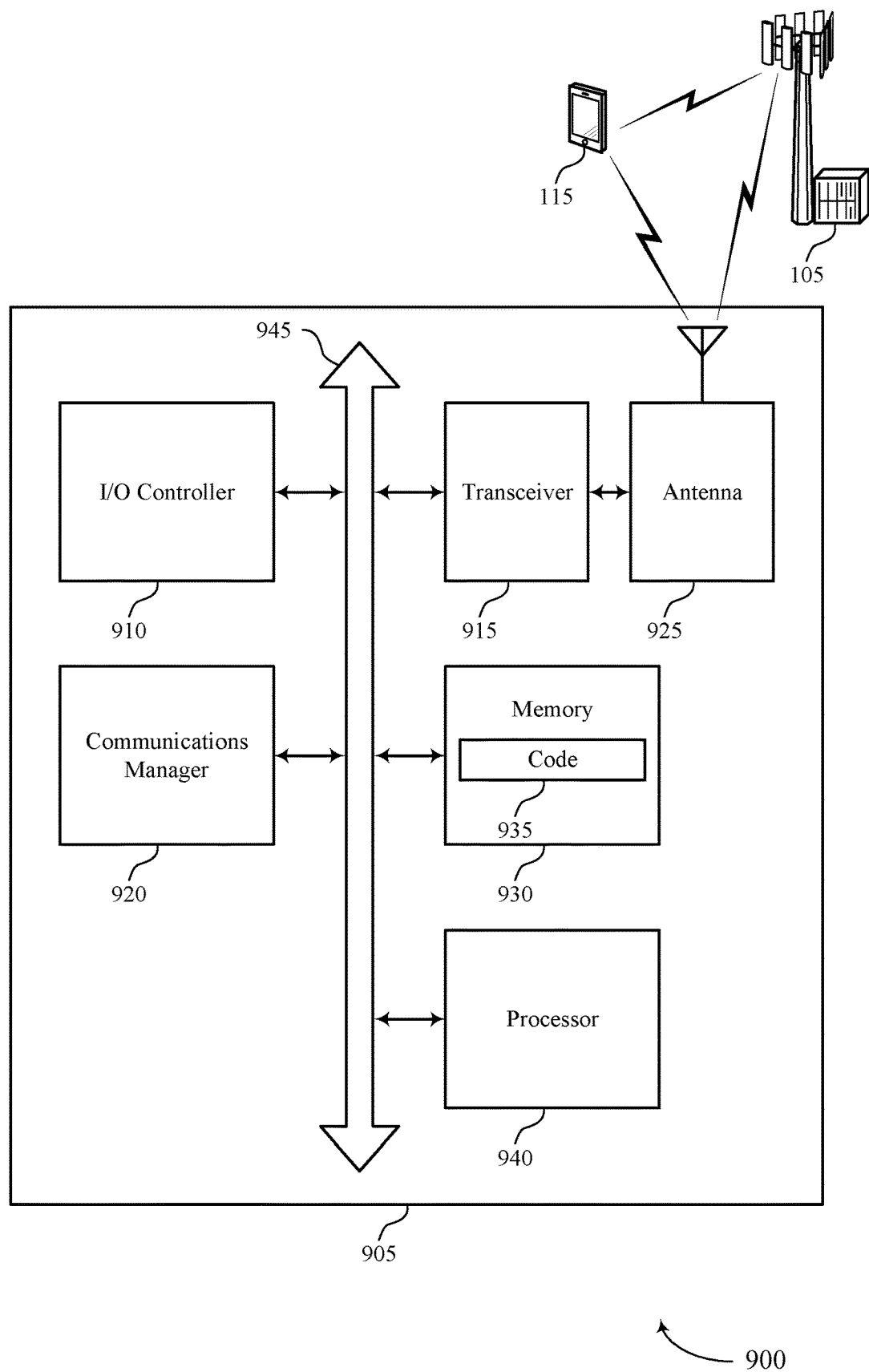
FIG. 9 shows a diagram of a system including a device that supports signaling for enabling full-duplex communications in the presence of a timing advance in accordance with one or more aspects of the present disclosure.

FIG. 9 shows a diagram of a system 900 including a device 905 that supports signaling for enabling full-duplex communications in the presence of a timing advance in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling for enabling full-duplex communications in the presence of a timing advance). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a control signal allocating a set of downlink resources and a set of uplink resources, where the set of uplink resources punctures the set of downlink resources and is allocated for transmitting feedback control information. The communications manager 920 may be configured as or otherwise support a means for generating an uplink signal including the feedback control information and one or more cancelation tones for canceling interference between a portion of a downlink signal and the uplink signal, the one or more cancelation tones being based on the feedback control information and a timing advance value. The communications manager 920 may be configured as or otherwise support a means for transmitting, while receiving the portion of the downlink signal on a portion of the set of downlink resources, the uplink signal including the feedback control information and the one or more cancelation tones using the set of uplink resources.

Additionally, or alternatively, the communications manager 920 may support wireless communication at a UE in accordance with examples as disclosed herein. For example, the communications manager 920 may be configured as or otherwise support a means for receiving a control signal allocating a set of downlink resources and a set of uplink resources, where the set of uplink resources punctures the set of downlink resources and is allocated for transmitting feedback control information. The communications manager 920 may be configured as or otherwise support a means for generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. The communications manager 920 may be configured as or otherwise support a means for transmitting, while receiving downlink data on a portion of the set of downlink resources, the uplink signal including the feedback control information using the set of uplink resources.

By including or configuring the communications manager 920 in accordance with examples as described herein, the device 905 may support techniques for improved communication reliability, reduced latency, improved user experience related to reduced processing, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of signaling for enabling full-duplex communications in the presence of a timing advance as described herein, or the processor 940 and the memory 930 may be otherwise configured to perform or support such operations.

Figure 10:
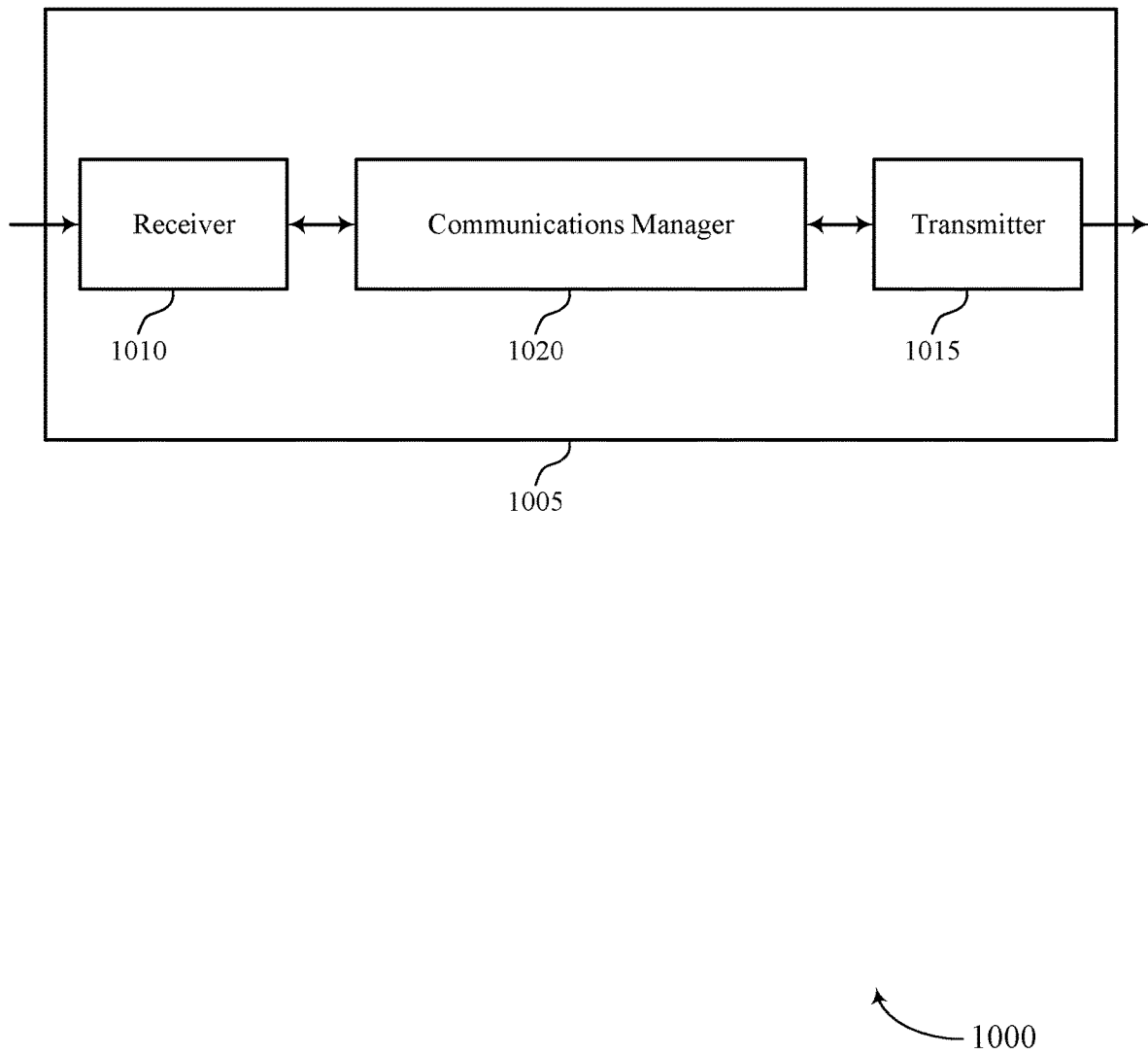
FIGS. 10 and 11 show block diagrams of devices that support signaling for enabling full-duplex communications in the presence of a timing advance in accordance with one or more aspects of the present disclosure.

FIG. 10 shows a block diagram 1000 of a device 1005 that supports signaling for enabling full-duplex communications in the presence of a timing advance in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of signaling for enabling full-duplex communications in the presence of a timing advance as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a control signal allocating a set of downlink resources and a set of uplink resources, where the set of uplink resources punctures the set of downlink resources and is allocated to a UE for transmitting feedback control information. The communications manager 1020 may be configured as or otherwise support a means for receiving, from the UE, an uplink signal including the feedback control information and one or more cancelation tones for canceling interference between a portion of a downlink signal and the uplink signal, the one or more cancelation tones being based on the feedback control information and a timing advance value.

Additionally, or alternatively, the communications manager 1020 may support wireless communication at a network entity in accordance with examples as disclosed herein. For example, the communications manager 1020 may be configured as or otherwise support a means for transmitting a control signal allocating a set of downlink resources and a set of uplink resources, where the set of uplink resources punctures the set of downlink resources and is allocated to a UE for transmitting feedback control information. The communications manager 1020 may be configured as or otherwise support a means for receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and more efficient utilization of communication resources.

Figure 11:
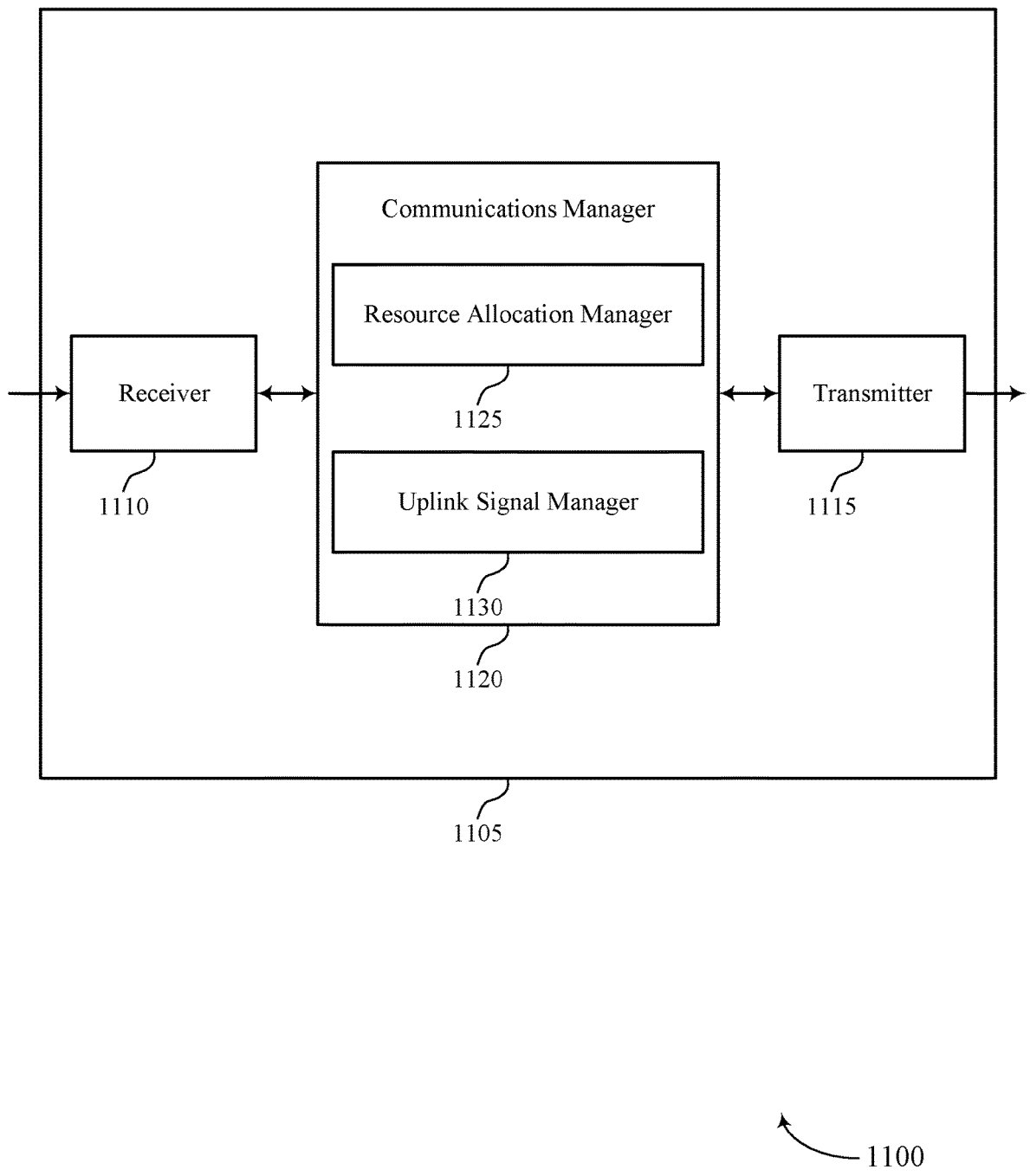

FIG. 11 shows a block diagram 1100 of a device 1105 that supports signaling for enabling full-duplex communications in the presence of a timing advance in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of signaling for enabling full-duplex communications in the presence of a timing advance as described herein. For example, the communications manager 1120 may include a resource allocation manager 1125 an uplink signal manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The resource allocation manager 1125 may be configured as or otherwise support a means for transmitting a control signal allocating a set of downlink resources and a set of uplink resources, where the set of uplink resources punctures the set of downlink resources and is allocated to a UE for transmitting feedback control information. The uplink signal manager 1130 may be configured as or otherwise support a means for receiving, from the UE, an uplink signal including the feedback control information and one or more cancelation tones for canceling interference between a portion of a downlink signal and the uplink signal, the one or more cancelation tones being based on the feedback control information and a timing advance value.

Additionally, or alternatively, the communications manager 1120 may support wireless communication at a network entity in accordance with examples as disclosed herein. The resource allocation manager 1125 may be configured as or otherwise support a means for transmitting a control signal allocating a set of downlink resources and a set of uplink resources, where the set of uplink resources punctures the set of downlink resources and is allocated to a UE for transmitting feedback control information. The uplink signal manager 1130 may be configured as or otherwise support a means for receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

Figure 12:
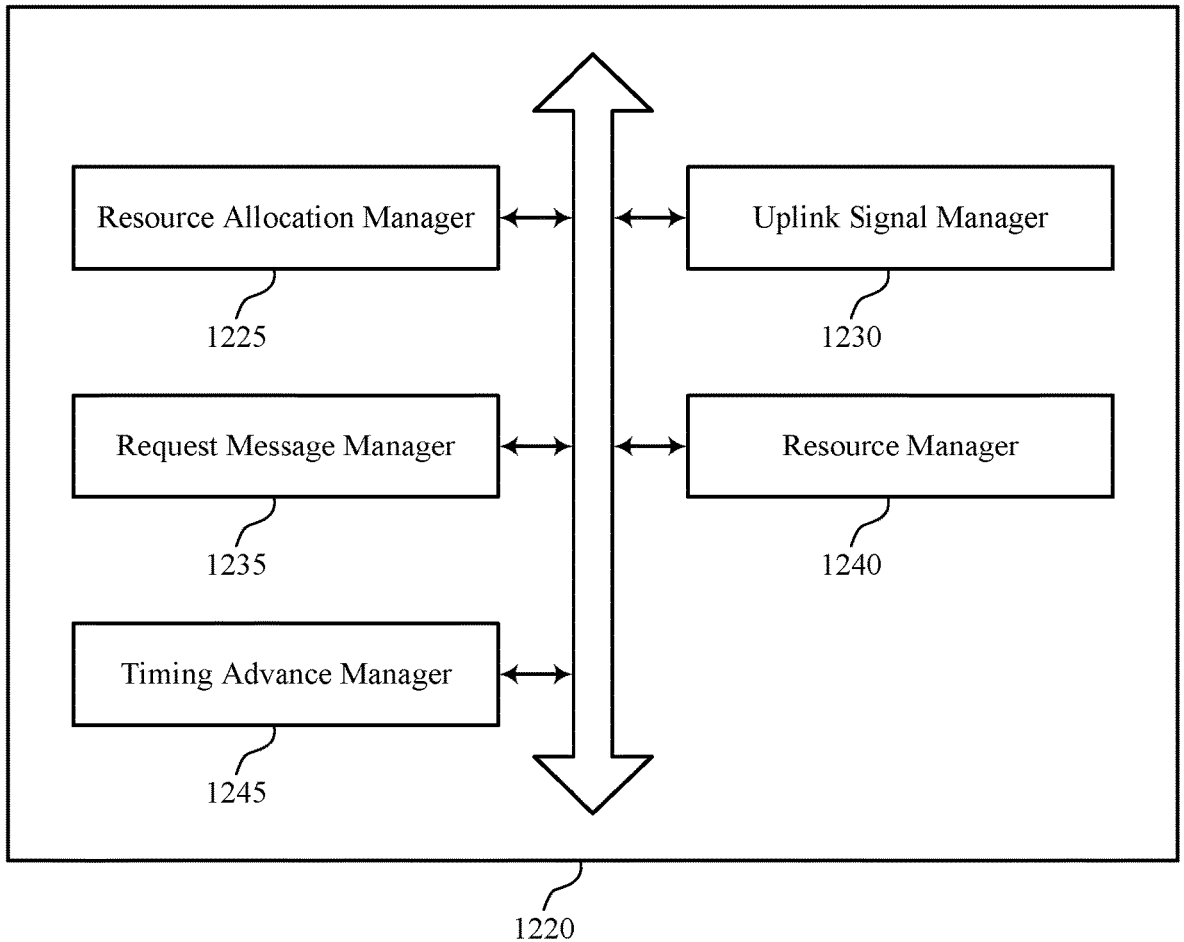
FIG. 12 shows a block diagram of a communications manager that supports signaling for enabling full-duplex communications in the presence of a timing advance in accordance with one or more aspects of the present disclosure.

FIG. 12 shows a block diagram 1200 of a communications manager 1220 that supports signaling for enabling full-duplex communications in the presence of a timing advance in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of signaling for enabling full-duplex communications in the presence of a timing advance as described herein. For example, the communications manager 1220 may include a resource allocation manager 1225, an uplink signal manager 1230, a request message manager 1235, a resource manager 1240, a timing advance manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The resource allocation manager 1225 may be configured as or otherwise support a means for transmitting a control signal allocating a set of downlink resources and a set of uplink resources, where the set of uplink resources punctures the set of downlink resources and is allocated to a UE for transmitting feedback control information. The uplink signal manager 1230 may be configured as or otherwise support a means for receiving, from the UE, an uplink signal including the feedback control information and one or more cancelation tones for canceling interference between a portion of a downlink signal and the uplink signal, the one or more cancelation tones being based on the feedback control information and a timing advance value.

In some examples, the resource allocation manager 1225 may be configured as or otherwise support a means for transmitting a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, where the uplink signal is based on the second control signal.

In some examples, the request message manager 1235 may be configured as or otherwise support a means for receiving a request message indicating a requested quantity of resources of the set of uplink resources for the one or more cancelation tones. In some examples, the resource manager 1240 may be configured as or otherwise support a means for determining the quantity of the resources allocated for the one or more cancelation tones based on the requested quantity of resources.

In some examples, the requested quantity of resources is based on one or more capabilities of the UE, one or more directional beams used by the UE, a signal-to-noise ratio at the UE, or any combination thereof.

In some examples, the request message includes uplink control information signaling, radio resource control signaling, medium access control (MAC) control element (MAC-CE) signaling, or any combination thereof.

In some examples, the timing advance manager 1245 may be configured as or otherwise support a means for determining the timing advance value. In some examples, the resource manager 1240 may be configured as or otherwise support a means for determining the quantity of resources of the set of uplink resources allocated for the one or more cancelation tones and the feedback control information, the location of the resources of the set of uplink resources allocated for the one or more cancelation tones and the feedback control information, or any combination thereof, based on the timing advance value.

In some examples, the quantity of the resources allocated for the one or more cancelation tones and the feedback control information, the location of the resources allocated for the one or more cancelation tones and the feedback control information, or both, is predetermined and based on the set of uplink resources.

In some examples, the second control signal includes downlink control information, radio resource control signaling, medium access control (MAC) control element (MAC-CE) signaling, or any combination thereof.

In some examples, the set of uplink resources includes a first location of resource elements and a first quantity of resource elements allocated for the feedback control information. In some examples, the set of uplink resources includes a second location of resource elements and a second quantity of resource elements allocated for the one or more cancelation tones.

Additionally, or alternatively, the communications manager 1220 may support wireless communication at a network entity in accordance with examples as disclosed herein. In some examples, the resource allocation manager 1225 may be configured as or otherwise support a means for transmitting a control signal allocating a set of downlink resources and a set of uplink resources, where the set of uplink resources punctures the set of downlink resources and is allocated to a UE for transmitting feedback control information. In some examples, the uplink signal manager 1230 may be configured as or otherwise support a means for receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

In some examples, a sum of the size of the first cyclic extension and the size of the second cyclic extension includes a symbol.

In some examples, a location of the first cyclic extension is based on timing advance value and a symbol index of the first uplink symbol, the location of the first cyclic extension including a beginning of the first uplink symbol, an end of the first uplink symbol, or both.

In some examples, a location of the second cyclic extension is based on timing advance value and a symbol index of the second uplink symbol, the location of the second cyclic extension including a beginning of the second uplink symbol, an end of the second uplink symbol, or both.

In some examples, a first downlink symbol of a portion of the set of downlink resources overlaps in time with the first cyclic extension and a portion of the first uplink symbol. In some examples, a second downlink symbol of the portion of the set of downlink resources overlaps in time with the second cyclic extension and a portion of the second uplink symbol, the second downlink symbol being different from the first downlink symbol.

In some examples, the first cyclic extension of the first uplink symbol is appended to an end of the first uplink symbol and the second cyclic extension of the second uplink symbol is appended to a beginning of the second uplink symbol.

Figure 13:
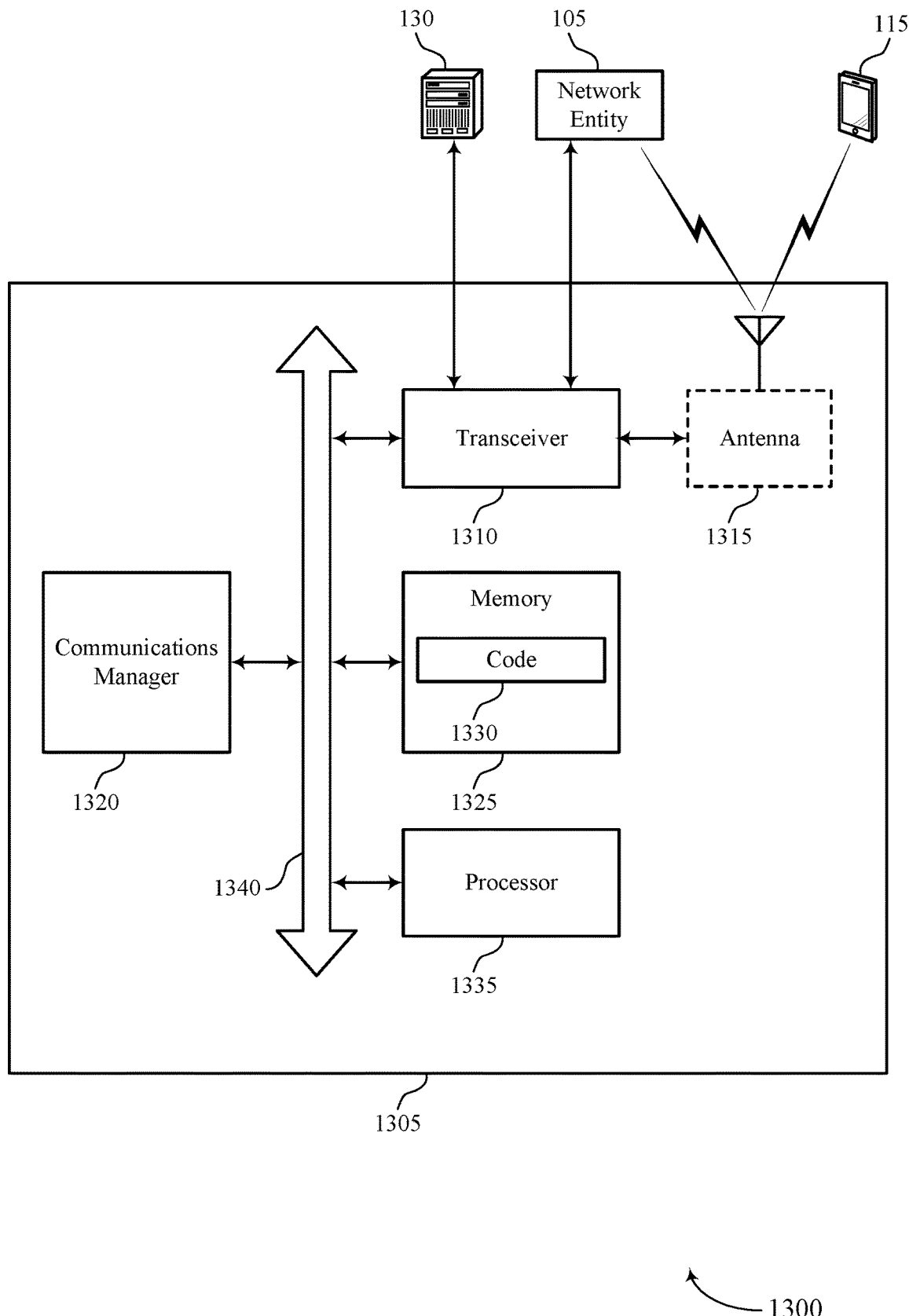
FIG. 13 shows a diagram of a system including a device that supports signaling for enabling full-duplex communications in the presence of a timing advance in accordance with one or more aspects of the present disclosure.

FIG. 13 shows a diagram of a system 1300 including a device 1305 that supports signaling for enabling full-duplex communications in the presence of a timing advance in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting signaling for enabling full-duplex communications in the presence of a timing advance). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a control signal allocating a set of downlink resources and a set of uplink resources, where the set of uplink resources punctures the set of downlink resources and is allocated to a UE for transmitting feedback control information. The communications manager 1320 may be configured as or otherwise support a means for receiving, from the UE, an uplink signal including the feedback control information and one or more cancelation tones for canceling interference between a portion of a downlink signal and the uplink signal, the one or more cancelation tones being based on the feedback control information and a timing advance value.

Additionally, or alternatively, the communications manager 1320 may support wireless communication at a network entity in accordance with examples as disclosed herein. For example, the communications manager 1320 may be configured as or otherwise support a means for transmitting a control signal allocating a set of downlink resources and a set of uplink resources, where the set of uplink resources punctures the set of downlink resources and is allocated to a UE for transmitting feedback control information. The communications manager 1320 may be configured as or otherwise support a means for receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal.

By including or configuring the communications manager 1320 in accordance with examples as described herein, the device 1305 may support techniques for improved communication reliability, reduced latency, improved user experience related to reduced processing, reduced power consumption, and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of signaling for enabling full-duplex communications in the presence of a timing advance as described herein, or the processor 1335 and the memory 1325 may be otherwise configured to perform or support such operations.

Figure 14:
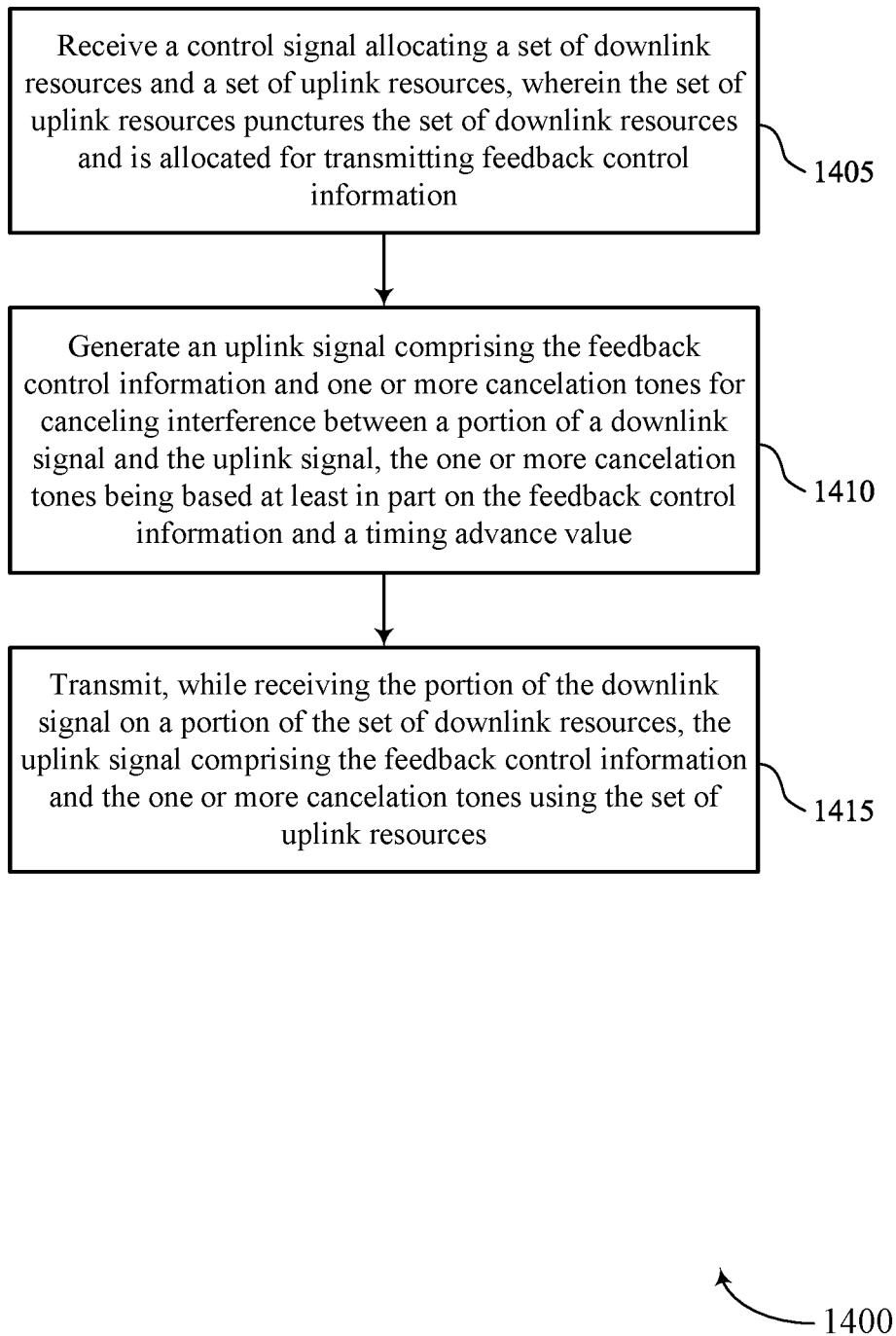
FIGS. 14 through 19 show flowcharts illustrating methods that support signaling for enabling full-duplex communications in the presence of a timing advance in accordance with one or more aspects of the present disclosure.

FIG. 14 shows a flowchart illustrating a method 1400 that supports signaling for enabling full-duplex communications in the presence of a timing advance in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a control signal allocating a set of downlink resources and a set of uplink resources, where the set of uplink resources punctures the set of downlink resources and is allocated for transmitting feedback control information. The operations of 1405 may be performed in accordance with examples as disclosed herein. In some examples, aspects of the operations of 1405 may be performed by a resource allocation component 825 as described with reference to FIG. 8.

At 1410, the method may include generating an uplink signal including the feedback control information and one or more cancelation tones for canceling interference between a portion of a downlink signal and the uplink signal, the one or more cancelation tones being based on the feedback control information and a timing advance value. The operations of 1410 may be performed in accordance with examples as disclosed herein. In some examples, aspects of the operations of 1410 may be performed by an uplink signal generating component 830 as described with reference to FIG. 8.

At 1415, the method may include transmitting, while receiving the portion of the downlink signal on a portion of the set of downlink resources, the uplink signal including the feedback control information and the one or more cancelation tones using the set of uplink resources. The operations of 1415 may be performed in accordance with examples as disclosed herein. In some examples, aspects of the operations of 1415 may be performed by an uplink signal communication component 835 as described with reference to FIG. 8.

Figure 15:
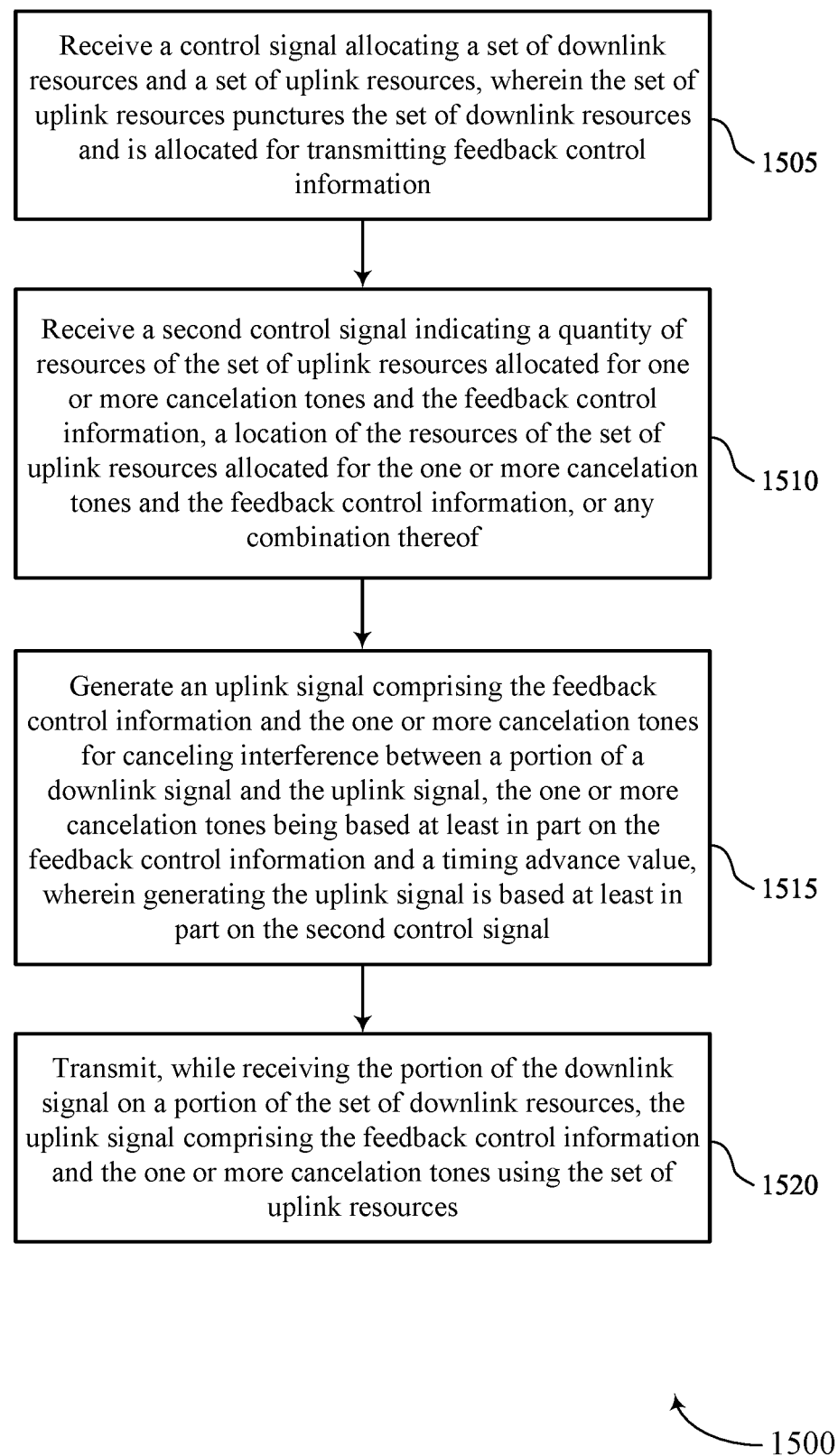

FIG. 15 shows a flowchart illustrating a method 1500 that supports signaling for enabling full-duplex communications in the presence of a timing advance in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a control signal allocating a set of downlink resources and a set of uplink resources, where the set of uplink resources punctures the set of downlink resources and is allocated for transmitting feedback control information. The operations of 1505 may be performed in accordance with examples as disclosed herein. In some examples, aspects of the operations of 1505 may be performed by a resource allocation component 825 as described with reference to FIG. 8.

At 1510, the method may include receiving a second control signal indicating a quantity of resources of the set of uplink resources allocated for one or more cancelation tones and the feedback control information, a location of the resources of the set of uplink resources allocated for the one or more cancelation tones and the feedback control information, or any combination thereof. The operations of 1510 may be performed in accordance with examples as disclosed herein. In some examples, aspects of the operations of 1510 may be performed by a resource allocation component 825 as described with reference to FIG. 8.

At 1515, the method may include generating an uplink signal including the feedback control information and the one or more cancelation tones for canceling interference between a portion of a downlink signal and the uplink signal, the one or more cancelation tones being based on the feedback control information and a timing advance value, where generating the uplink signal is based on the second control signal. The operations of 1515 may be performed in accordance with examples as disclosed herein. In some examples, aspects of the operations of 1515 may be performed by an uplink signal generating component 830 as described with reference to FIG. 8.

At 1520, the method may include transmitting, while receiving the portion of the downlink signal on a portion of the set of downlink resources, the uplink signal including the feedback control information and the one or more cancelation tones using the set of uplink resources. The operations of 1520 may be performed in accordance with examples as disclosed herein. In some examples, aspects of the operations of 1520 may be performed by an uplink signal communication component 835 as described with reference to FIG. 8.

Figure 16:
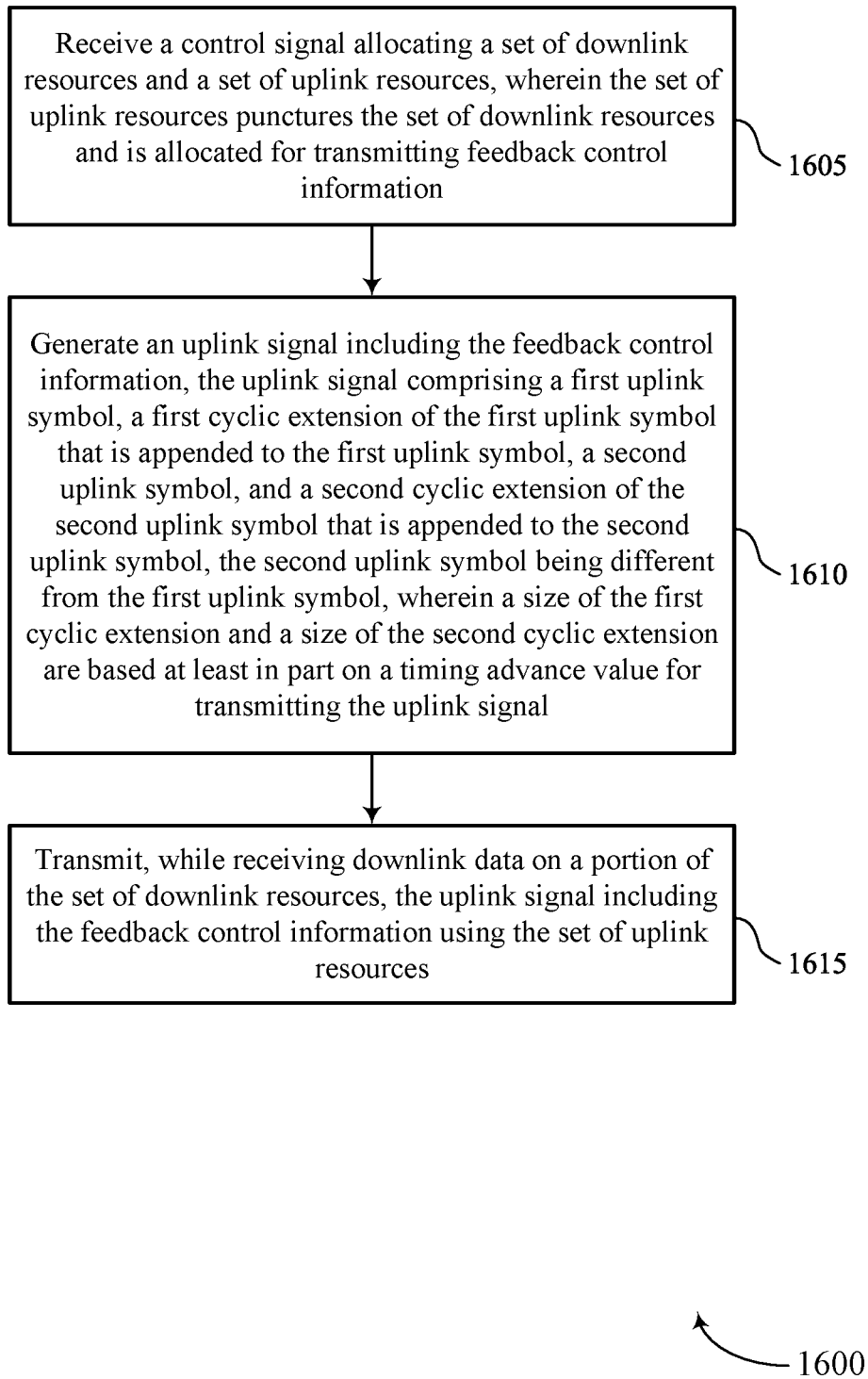

FIG. 16 shows a flowchart illustrating a method 1600 that supports signaling for enabling full-duplex communications in the presence of a timing advance in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a control signal allocating a set of downlink resources and a set of uplink resources, where the set of uplink resources punctures the set of downlink resources and is allocated for transmitting feedback control information. The operations of 1605 may be performed in accordance with examples as disclosed herein. In some examples, aspects of the operations of 1605 may be performed by a resource allocation component 825 as described with reference to FIG. 8.

At 1610, the method may include generating an uplink signal including the feedback control information, the uplink signal including a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. The operations of 1610 may be performed in accordance with examples as disclosed herein. In some examples, aspects of the operations of 1610 may be performed by an uplink signal generating component 830 as described with reference to FIG. 8.

At 1615, the method may include transmitting, while receiving downlink data on a portion of the set of downlink resources, the uplink signal including the feedback control information using the set of uplink resources. The operations of 1615 may be performed in accordance with examples as disclosed herein. In some examples, aspects of the operations of 1615 may be performed by an uplink signal communication component 835 as described with reference to FIG. 8.

Figure 17:
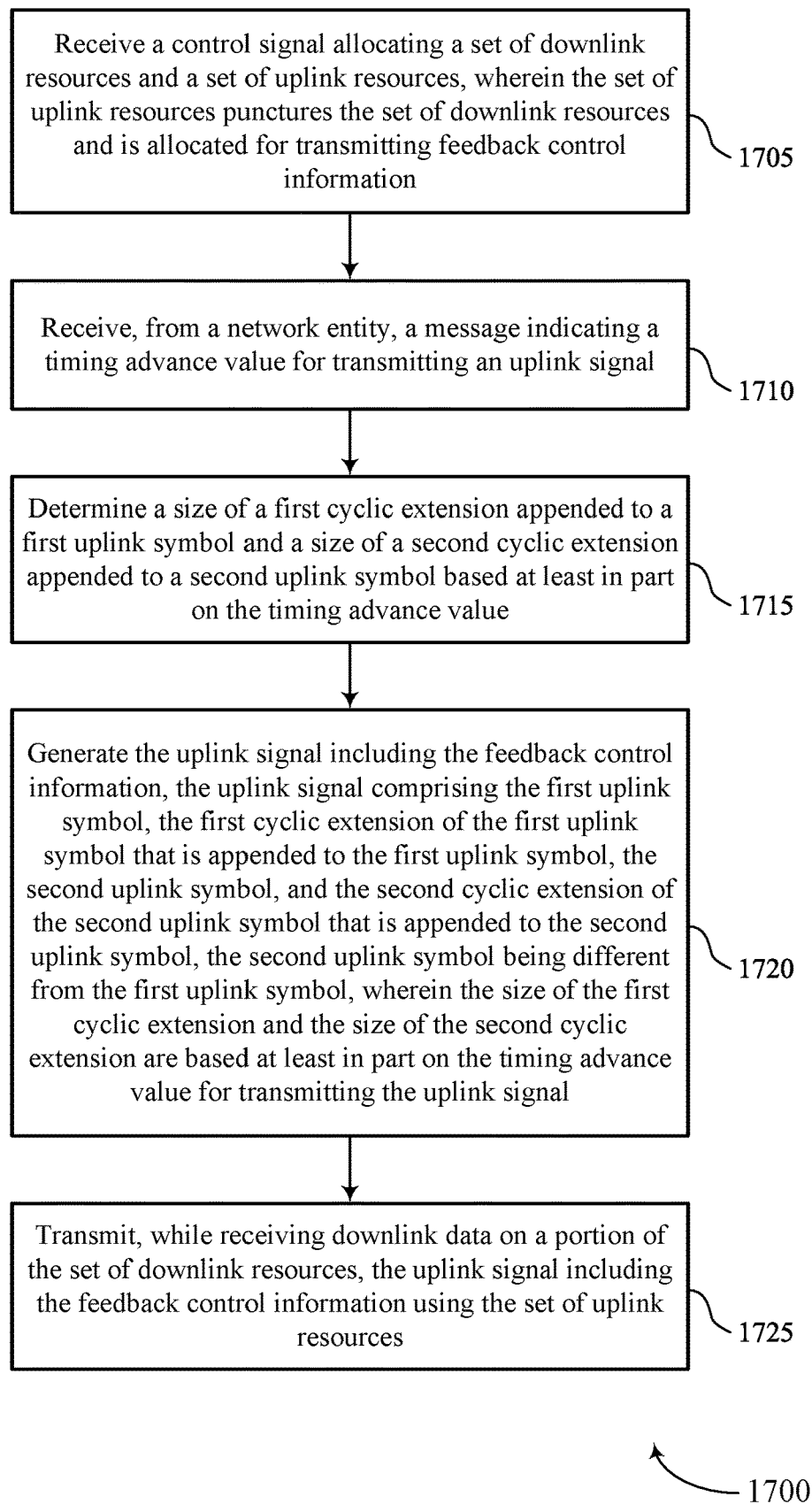

FIG. 17 shows a flowchart illustrating a method 1700 that supports signaling for enabling full-duplex communications in the presence of a timing advance in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a control signal allocating a set of downlink resources and a set of uplink resources, where the set of uplink resources punctures the set of downlink resources and is allocated for transmitting feedback control information. The operations of 1705 may be performed in accordance with examples as disclosed herein. In some examples, aspects of the operations of 1705 may be performed by a resource allocation component 825 as described with reference to FIG. 8.

At 1710, the method may include receiving, from a network entity, a message indicating a timing advance value for transmitting an uplink signal. The operations of 1710 may be performed in accordance with examples as disclosed herein. In some examples, aspects of the operations of 1710 may be performed by a timing advance indication component 845 as described with reference to FIG. 8.

At 1715, the method may include determining a size of a first cyclic extension appended to a first uplink symbol and a size of a second cyclic extension appended to a second uplink symbol based on the timing advance value. The operations of 1715 may be performed in accordance with examples as disclosed herein. In some examples, aspects of the operations of 1715 may be performed by a cyclic extension determining component 850 as described with reference to FIG. 8.

At 1720, the method may include generating the uplink signal including the feedback control information, the uplink signal including the first uplink symbol, the first cyclic extension of the first uplink symbol that is appended to the first uplink symbol, the second uplink symbol, and the second cyclic extension of the second uplink symbol that is appended to the second uplink symbol, the second uplink symbol being different from the first uplink symbol, where the size of the first cyclic extension and the size of the second cyclic extension are based on the timing advance value for transmitting the uplink signal. The operations of 1720 may be performed in accordance with examples as disclosed herein. In some examples, aspects of the operations of 1720 may be performed by an uplink signal generating component 830 as described with reference to FIG. 8.

At 1725, the method may include transmitting, while receiving downlink data on a portion of the set of downlink resources, the uplink signal including the feedback control information using the set of uplink resources. The operations of 1725 may be performed in accordance with examples as disclosed herein. In some examples, aspects of the operations of 1725 may be performed by an uplink signal communication component 835 as described with reference to FIG. 8.

Figure 18:
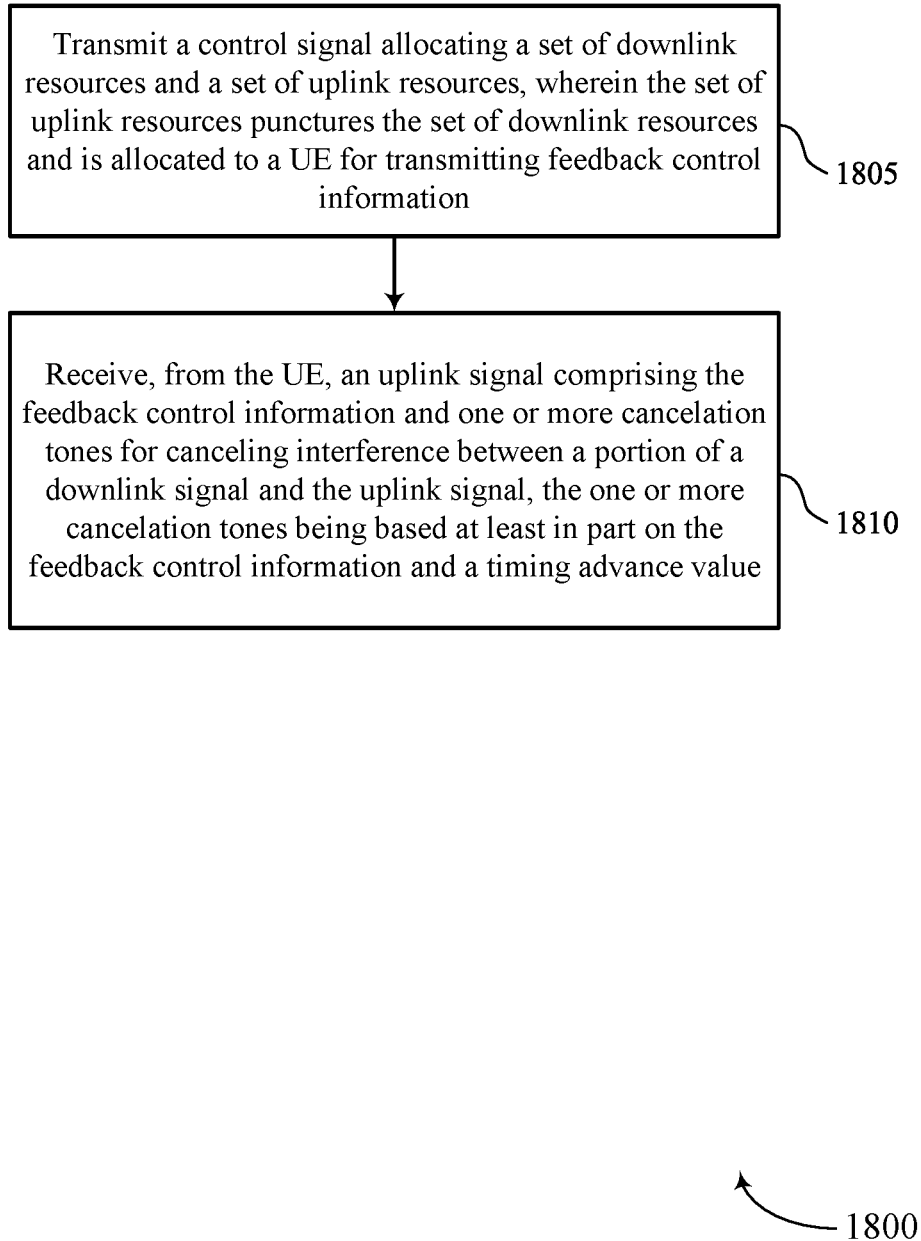

FIG. 18 shows a flowchart illustrating a method 1800 that supports signaling for enabling full-duplex communications in the presence of a timing advance in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a control signal allocating a set of downlink resources and a set of uplink resources, where the set of uplink resources punctures the set of downlink resources and is allocated to a UE for transmitting feedback control information. The operations of 1805 may be performed in accordance with examples as disclosed herein. In some examples, aspects of the operations of 1805 may be performed by a resource allocation manager 1225 as described with reference to FIG. 12.

At 1810, the method may include receiving, from the UE, an uplink signal including the feedback control information and one or more cancelation tones for canceling interference between a portion of a downlink signal and the uplink signal, the one or more cancelation tones being based on the feedback control information and a timing advance value. The operations of 1810 may be performed in accordance with examples as disclosed herein. In some examples, aspects of the operations of 1810 may be performed by an uplink signal manager 1230 as described with reference to FIG. 12.

Figure 19:
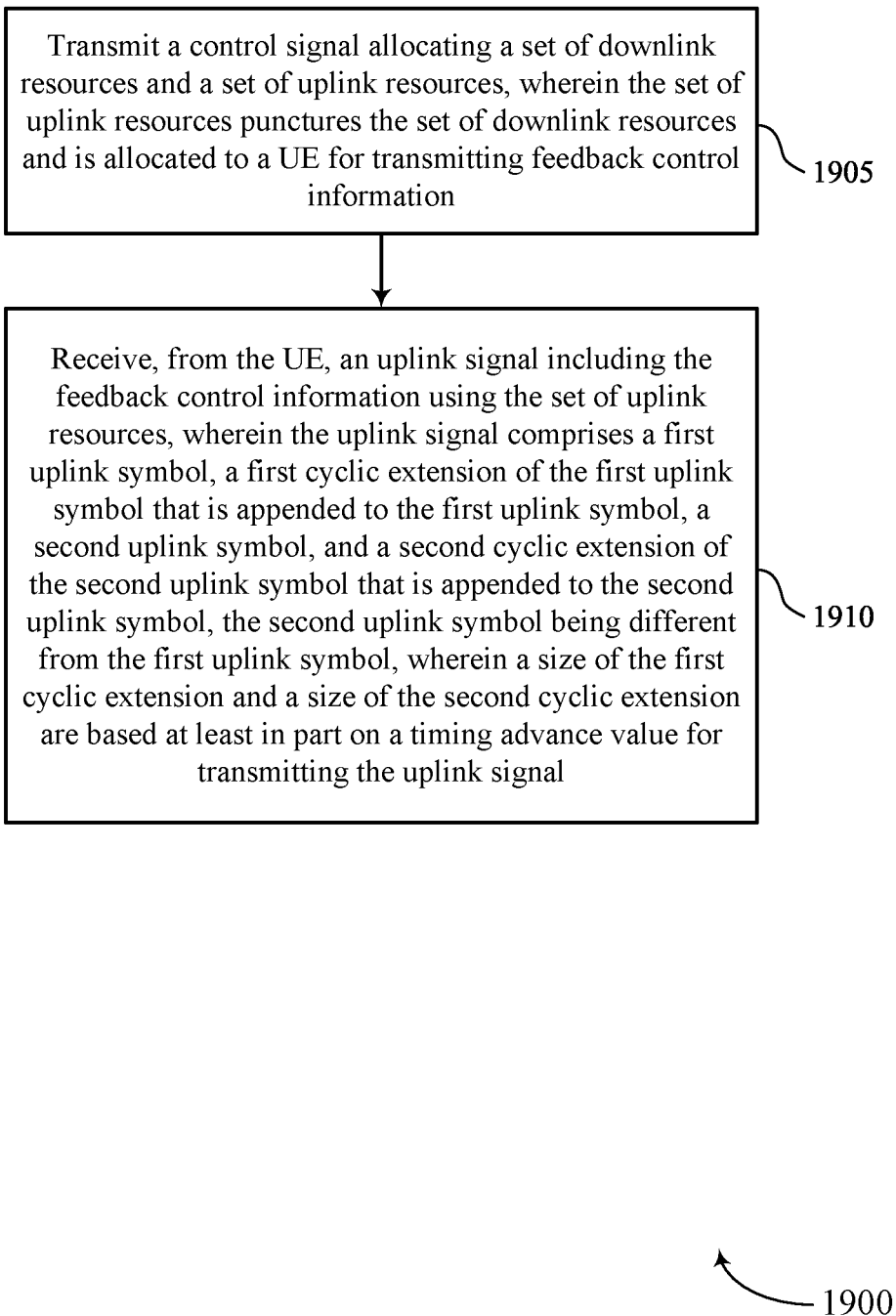

FIG. 19 shows a flowchart illustrating a method 1900 that supports signaling for enabling full-duplex communications in the presence of a timing advance in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a control signal allocating a set of downlink resources and a set of uplink resources, where the set of uplink resources punctures the set of downlink resources and is allocated to a UE for transmitting feedback control information. The operations of 1905 may be performed in accordance with examples as disclosed herein. In some examples, aspects of the operations of 1905 may be performed by a resource allocation manager 1225 as described with reference to FIG. 12.

At 1910, the method may include receiving, from the UE, an uplink signal including the feedback control information using the set of uplink resources, where the uplink signal includes a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, where a size of the first cyclic extension and a size of the second cyclic extension are based on a timing advance value for transmitting the uplink signal. The operations of 1910 may be performed in accordance with examples as disclosed herein. In some examples, aspects of the operations of 1910 may be performed by an uplink signal manager 1230 as described with reference to FIG. 12.

The following provides an overview of aspects of the present disclosure:

Aspect 1: A method for wireless communication at a UE, comprising: receiving a control signal allocating a set of downlink resources and a set of uplink resources, wherein the set of uplink resources punctures the set of downlink resources and is allocated for transmitting feedback control information; generating an uplink signal comprising the feedback control information and one or more cancelation tones for canceling interference between a portion of a downlink signal and the uplink signal, the one or more cancelation tones being based at least in part on the feedback control information and a timing advance value; and transmitting, while receiving the portion of the downlink signal on a portion of the set of downlink resources, the uplink signal comprising the feedback control information and the one or more cancelation tones using the set of uplink resources.

Aspect 2: The method of aspect 1, further comprising: receiving a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, wherein generating the uplink signal is based at least in part on the second control signal.

Aspect 3: The method of aspect 2, further comprising: transmitting a request message indicating a requested quantity of resources of the set of uplink resources for the one or more cancelation tones, wherein the quantity of the resources allocated for the one or more cancelation tones is based at least in part on the requested quantity of resources.

Aspect 4: The method of aspect 3, further comprising: determining the requested quantity of resources based at least in part on one or more capabilities of the UE.

Aspect 5: The method of any of aspects 3 through 4, further comprising: determining the requested quantity of resources for the one or more cancelation tones based at least in part on one or more directional beams selected by the UE.

Aspect 6: The method of any of aspects 3 through 5, further comprising: determining the requested quantity of resources for the one or more cancelation tones based at least in part on a signal-to-noise ratio at the UE.

Aspect 7: The method of any of aspects 3 through 6, wherein the request message comprises uplink control information signaling, radio resource control signaling, medium access control (MAC) control element (MAC-CE) signaling, or any combination thereof.

Aspect 8: The method of any of aspects 2 through 7, wherein the quantity of the resources allocated for the one or more cancelation tones and the feedback control information, the location of the resources allocated for the one or more cancelation tones and the feedback control information, or both, is predetermined and based at least in part on the set of uplink resources.

Aspect 9: The method of any of aspects 2 through 8, wherein the quantity of the resources allocated for the one or more cancelation tones, the location of the resources allocated for the one or more cancelation tones, or both, is based at least in part on the timing advance value.

Aspect 10: The method of any of aspects 2 through 9, wherein the second control signal comprises downlink control information, radio resource control signaling, medium access control (MAC) control element (MAC-CE) signaling, or any combination thereof.

Aspect 11: The method of any of aspects 1 through 10, further comprising: generating the one or more cancelation tones based at least in part on the timing advance value, wherein one or more values of the one or more cancelation tones are based at least in part on the timing advance value.

Aspect 12: The method of any of aspects 1 through 11, wherein the set of uplink resources includes a first location of resource elements and a first quantity of resource elements allocated for the feedback control information; and the set of uplink resources includes a second location of resource elements and a second quantity of resource elements allocated for the one or more cancelation tones.

Aspect 13: A method for wireless communication at a UE, comprising: receiving a control signal allocating a set of downlink resources and a set of uplink resources, wherein the set of uplink resources punctures the set of downlink resources and is allocated for transmitting feedback control information; generating an uplink signal including the feedback control information, the uplink signal comprising a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, wherein a size of the first cyclic extension and a size of the second cyclic extension are based at least in part on a timing advance value for transmitting the uplink signal; and transmitting, while receiving downlink data on a portion of the set of downlink resources, the uplink signal including the feedback control information using the set of uplink resources.

Aspect 14: The method of aspect 13, further comprising: receiving, from a network entity, a message indicating the timing advance value for transmitting the uplink signal; and determining the size of the first cyclic extension appended to the first uplink symbol and the size of the second cyclic extension appended to the second uplink symbol based at least in part on the timing advance value.

Aspect 15: The method of aspect 14, wherein a sum of the size of the first cyclic extension and the size of the second cyclic extension comprises a symbol.

Aspect 16: The method of any of aspects 13 through 15, further comprising: receiving, from a network entity, a message indicating the timing advance value for transmitting the uplink signal; and determining a location of the first cyclic extension appended to the first uplink symbol and a location of the second cyclic extension appended to the second uplink symbol based at least in part on the timing advance value and respective symbol indices of the first uplink symbol and the second uplink symbol.

Aspect 17: The method of aspect 16, wherein the location of the first cyclic extension comprises a beginning of the first uplink symbol, an end of the first uplink symbol, or both.

Aspect 18: The method of any of aspects 16 through 17, wherein the location of the second cyclic extension comprises a beginning of the second uplink symbol, an end of the second uplink symbol, or both.

Aspect 19: The method of any of aspects 13 through 18, wherein a first downlink symbol of the portion of the set of downlink resources overlaps in time with the first cyclic extension and a portion of the first uplink symbol; and a second downlink symbol of the portion of the set of downlink resources overlaps in time with the second cyclic extension and a portion of the second uplink symbol, the second downlink symbol being different from the first downlink symbol.

Aspect 20: The method of any of aspects 13 through 19, wherein the first cyclic extension of the first uplink symbol is appended to an end of the first uplink symbol.

Aspect 21: The method of any of aspects 13 through 20, wherein the second cyclic extension of the second uplink symbol is appended to a beginning of the second uplink symbol.

Aspect 22: A method for wireless communication at a network entity, comprising: transmitting a control signal allocating a set of downlink resources and a set of uplink resources, wherein the set of uplink resources punctures the set of downlink resources and is allocated to a UE for transmitting feedback control information; and receiving, from the UE, an uplink signal comprising the feedback control information and one or more cancelation tones for canceling interference between a portion of a downlink signal and the uplink signal, the one or more cancelation tones being based at least in part on the feedback control information and a timing advance value.

Aspect 23: The method of aspect 22, further comprising: transmitting a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, wherein the uplink signal is based at least in part on the second control signal.

Aspect 24: The method of aspect 23, further comprising: receiving a request message indicating a requested quantity of resources of the set of uplink resources for the one or more cancelation tones; and determining the quantity of the resources allocated for the one or more cancelation tones based at least in part on the requested quantity of resources.

Aspect 25: The method of aspect 24, wherein the requested quantity of resources is based at least in part on one or more capabilities of the UE, one or more directional beams used by the UE, a signal-to-noise ratio at the UE, or any combination thereof.

Aspect 26: The method of any of aspects 24 through 25, wherein the request message comprises uplink control information signaling, radio resource control signaling, medium access control (MAC) control element (MAC-CE) signaling, or any combination thereof.

Aspect 27: The method of any of aspects 23 through 26, further comprising: determining the timing advance value; and determining the quantity of resources of the set of uplink resources allocated for the one or more cancelation tones and the feedback control information, the location of the resources of the set of uplink resources allocated for the one or more cancelation tones and the feedback control information, or any combination thereof, based at least in part on the timing advance value.

Aspect 28: The method of any of aspects 23 through 27, wherein the quantity of the resources allocated for the one or more cancelation tones and the feedback control information, the location of the resources allocated for the one or more cancelation tones and the feedback control information, or both, is predetermined and based at least in part on the set of uplink resources.

Aspect 29: The method of any of aspects 23 through 28, wherein the second control signal comprises downlink control information, radio resource control signaling, medium access control (MAC) control element (MAC-CE) signaling, or any combination thereof.

Aspect 30: The method of any of aspects 22 through 29, wherein the set of uplink resources includes a first location of resource elements and a first quantity of resource elements allocated for the feedback control information; and the set of uplink resources includes a second location of resource elements and a second quantity of resource elements allocated for the one or more cancelation tones.

Aspect 31: A method for wireless communication at a network entity, comprising: transmitting a control signal allocating a set of downlink resources and a set of uplink resources, wherein the set of uplink resources punctures the set of downlink resources and is allocated to a UE for transmitting feedback control information; and receiving, from the UE, an uplink signal including the feedback control information using the set of uplink resources, wherein the uplink signal comprises a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, wherein a size of the first cyclic extension and a size of the second cyclic extension are based at least in part on a timing advance value for transmitting the uplink signal.

Aspect 32: The method of aspect 31, wherein a sum of the size of the first cyclic extension and the size of the second cyclic extension comprises a symbol.

Aspect 33: The method of any of aspects 31 through 32, wherein a location of the first cyclic extension is based at least in part on timing advance value and a symbol index of the first uplink symbol, the location of the first cyclic extension comprising a beginning of the first uplink symbol, an end of the first uplink symbol, or both.

Aspect 34: The method of any of aspects 31 through 33, wherein a location of the second cyclic extension is based at least in part on timing advance value and a symbol index of the second uplink symbol, the location of the second cyclic extension comprising a beginning of the second uplink symbol, an end of the second uplink symbol, or both.

Aspect 35: The method of any of aspects 31 through 34, wherein a first downlink symbol of a portion of the set of downlink resources overlaps in time with the first cyclic extension and a portion of the first uplink symbol; and a second downlink symbol of the portion of the set of downlink resources overlaps in time with the second cyclic extension and a portion of the second uplink symbol, the second downlink symbol being different from the first downlink symbol.

Aspect 36: The method of any of aspects 31 through 35, wherein the first cyclic extension of the first uplink symbol is appended to an end of the first uplink symbol and the second cyclic extension of the second uplink symbol is appended to a beginning of the second uplink symbol.

Aspect 37: An apparatus for wireless communication at a UE, comprising a processor; memory coupled with the processor; and instructions stored in the memory and executable by the processor to cause the apparatus to perform a method of any of aspects 1 through 12.

Aspect 38: An apparatus for wireless communication at a UE, comprising at least one means for performing a method of any of aspects 1 through 12.

Aspect 39: A non-transitory computer-readable medium storing code for wireless communication at a UE, the code comprising instructions executable by a processor to perform a method of any of aspects 1 through 12.

Aspect 40: An apparatus for wireless communication at a UE, comprising a processor; memory coupled with the processor; and instructions stored in the memory and executable by the processor to cause the apparatus to perform a method of any of aspects 13 through 21.

Aspect 41: An apparatus for wireless communication at a UE, comprising at least one means for performing a method of any of aspects 13 through 21.

Aspect 42: A non-transitory computer-readable medium storing code for wireless communication at a UE, the code comprising instructions executable by a processor to perform a method of any of aspects 13 through 21.

Aspect 43: An apparatus for wireless communication at a network entity, comprising a processor; memory coupled with the processor; and instructions stored in the memory and executable by the processor to cause the apparatus to perform a method of any of aspects 22 through 30.

Aspect 44: An apparatus for wireless communication at a network entity, comprising at least one means for performing a method of any of aspects 22 through 30.

Aspect 45: A non-transitory computer-readable medium storing code for wireless communication at a network entity, the code comprising instructions executable by a processor to perform a method of any of aspects 22 through 30.

Aspect 46: An apparatus for wireless communication at a network entity, comprising a processor; memory coupled with the processor; and instructions stored in the memory and executable by the processor to cause the apparatus to perform a method of any of aspects 31 through 36.

Aspect 47: An apparatus for wireless communication at a network entity, comprising at least one means for performing a method of any of aspects 31 through 36.

Aspect 48: A non-transitory computer-readable medium storing code for wireless communication at a network entity, the code comprising instructions executable by a processor to perform a method of any of aspects 31 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a control signal allocating a set of downlink resources and a set of uplink resources, wherein the set of uplink resources punctures the set of downlink resources and is allocated for transmitting feedback control information;
   generating an uplink signal comprising the feedback control information and one or more cancelation tones for canceling interference between a portion of a downlink signal and the uplink signal, the one or more cancelation tones being based at least in part on the feedback control information and a timing advance value; and
   transmitting, while receiving the portion of the downlink signal on a portion of the set of downlink resources, the uplink signal comprising the feedback control information and the one or more cancelation tones using the set of uplink resources.

2. The method of claim 1, further comprising:
   receiving a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, wherein generating the uplink signal is based at least in part on the second control signal.

3. The method of claim 2, further comprising:
   transmitting a request message indicating a requested quantity of resources of the set of uplink resources for the one or more cancelation tones, wherein the quantity of the resources allocated for the one or more cancelation tones is based at least in part on the requested quantity of resources.

4. The method of claim 3, further comprising:
   determining the requested quantity of resources based at least in part on one or more capabilities of the UE, one or more directional beams used by the UE, a signal-to-noise ratio at the UE, or any combination thereof.

5. The method of claim 3, wherein the request message comprises uplink control information signaling, radio resource control signaling, medium access control (MAC) control element (MAC-CE) signaling, or any combination thereof.

6. The method of claim 2, wherein the quantity of the resources allocated for the one or more cancelation tones and the feedback control information, the location of the resources allocated for the one or more cancelation tones and the feedback control information, or both, is predetermined and based at least in part on the set of uplink resources.

7. The method of claim 2, wherein the quantity of the resources allocated for the one or more cancelation tones, the location of the resources allocated for the one or more cancelation tones, or both, is based at least in part on the timing advance value.

8. The method of claim 2, wherein the second control signal comprises downlink control information, radio resource control signaling, medium access control (MAC) control element (MAC-CE) signaling, or any combination thereof.

9. The method of claim 1, further comprising:
generating the one or more cancelation tones based at least in part on the timing advance value, wherein one or more values of the one or more cancelation tones are based at least in part on the timing advance value.

10. The method of claim 1, wherein:
the set of uplink resources includes a first location of resource elements and a first quantity of resource elements allocated for the feedback control information; and
the set of uplink resources includes a second location of resource elements and a second quantity of resource elements allocated for the one or more cancelation tones.

11. The method of claim 1, further comprising:
generating the one or more cancelation tones based at least in part on the timing advance value, wherein one or more values of the one or more cancelation tones are based at least in part on the timing advance value.

12. The method of claim 1, wherein:
the set of uplink resources includes a first location of resource elements and a first quantity of resource elements allocated for the feedback control information; and
the set of uplink resources includes a second location of resource elements and a second quantity of resource elements allocated for the one or more cancelation tones.

13. A method for wireless communication at a user equipment (UE), comprising:
receiving a control signal allocating a set of downlink resources and a set of uplink resources, wherein the set of uplink resources punctures the set of downlink resources and is allocated for transmitting feedback control information;
generating an uplink signal including the feedback control information, the uplink signal comprising a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, wherein a size of the first cyclic extension and a size of the second cyclic extension are based at least in part on a timing advance value for transmitting the uplink signal; and
transmitting, while receiving downlink data on a portion of the set of downlink resources, the uplink signal including the feedback control information using the set of uplink resources.

14. The method of claim 13, further comprising:
receiving, from a network entity, a message indicating the timing advance value for transmitting the uplink signal; and
determining the size of the first cyclic extension appended to the first uplink symbol and the size of the second cyclic extension appended to the second uplink symbol based at least in part on the timing advance value.

15. The method of claim 14, wherein a sum of the size of the first cyclic extension and the size of the second cyclic extension comprises a symbol.

16. The method of claim 13, further comprising:
receiving, from a network entity, a message indicating the timing advance value for transmitting the uplink signal; and
determining a location of the first cyclic extension appended to the first uplink symbol and a location of the second cyclic extension appended to the second uplink symbol based at least in part on the timing advance value and respective symbol indices of the first uplink symbol and the second uplink symbol.

17. The method of claim 16, wherein the location of the first cyclic extension comprises a beginning of the first uplink symbol, an end of the first uplink symbol, or both.

18. The method of claim 16, wherein the location of the second cyclic extension comprises a beginning of the second uplink symbol, an end of the second uplink symbol, or both.

19. The method of claim 13, wherein:
a first downlink symbol of the portion of the set of downlink resources overlaps in time with the first cyclic extension and a portion of the first uplink symbol; and
a second downlink symbol of the portion of the set of downlink resources overlaps in time with the second cyclic extension and a portion of the second uplink symbol, the second downlink symbol being different from the first downlink symbol.

20. The method of claim 13, wherein the first cyclic extension of the first uplink symbol is appended to an end of the first uplink symbol and the second cyclic extension of the second uplink symbol is appended to a beginning of the second uplink symbol.

21. A method for wireless communication at a network entity, comprising:
transmitting a control signal allocating a set of downlink resources and a set of uplink resources, wherein the set of uplink resources punctures the set of downlink resources and is allocated to a user equipment (UE) for transmitting feedback control information; and
receiving, from the UE, an uplink signal comprising the feedback control information and one or more cancelation tones for canceling interference between a portion of a downlink signal and the uplink signal, the one or more cancelation tones being based at least in part on the feedback control information and a timing advance value.

22. The method of claim 21, further comprising:
transmitting a second control signal indicating a quantity of resources of the set of uplink resources allocated for the one or more cancelation tones and the feedback control information, a location of the resources of the set of uplink resources allocated for the one or more cancelation tones and the feedback control information, or any combination thereof, wherein the uplink signal is based at least in part on the second control signal.

23. The method of claim 22, further comprising:
receiving a request message indicating a requested quantity of resources of the set of uplink resources for the one or more cancelation tones; and determining the quantity of the resources allocated for the one or more cancelation tones based at least in part on the requested quantity of resources.

24. The method of claim 23, wherein the requested quantity of resources is based at least in part on one or more capabilities of the UE, one or more directional beams used by the UE, a signal-to-noise ratio at the UE, or any combination thereof.

25. The method of claim 23, wherein the request message comprises uplink control information signaling, radio resource control signaling, medium access control (MAC) control element (MAC-CE) signaling, or any combination thereof.

26. The method of claim 22, further comprising:
determining the timing advance value; and
determining the quantity of resources of the set of uplink resources allocated for the one or more cancelation tones and the feedback control information, the location of the resources of the set of uplink resources allocated for the one or more cancelation tones and the feedback control information, or any combination thereof, based at least in part on the timing advance value.

27. A method for wireless communication at a network entity, comprising:
transmitting a control signal allocating a set of downlink resources and a set of uplink resources, wherein the set of uplink resources punctures the set of downlink resources and is allocated to a user equipment (UE) for transmitting feedback control information; and
receiving, from the UE, an uplink signal including the feedback control information using the set of uplink resources, wherein the uplink signal comprises a first uplink symbol, a first cyclic extension of the first uplink symbol that is appended to the first uplink symbol, a second uplink symbol, and a second cyclic extension of the second uplink symbol that is appended to the second uplink symbol, the second uplink symbol being different from the first uplink symbol, wherein a size of the first cyclic extension and a size of the second cyclic extension are based at least in part on a timing advance value for transmitting the uplink signal.

28. The method of claim 27, wherein a sum of the size of the first cyclic extension and the size of the second cyclic extension comprises a symbol.

29. The method of claim 27, wherein a location of the first cyclic extension is based at least in part on timing advance value and a symbol index of the first uplink symbol, the location of the first cyclic extension comprising a beginning of the first uplink symbol, an end of the first uplink symbol, or both.

30. The method of claim 27, wherein a location of the second cyclic extension is based at least in part on timing advance value and a symbol index of the second uplink symbol, the location of the second cyclic extension comprising a beginning of the second uplink symbol, an end of the second uplink symbol, or both.

* * * * *